United States Patent
Ramkumar et al.

(10) Patent No.: US 9,332,489 B2
(45) Date of Patent: May 3, 2016

(54) METHOD AND SYSTEM FOR OPTIMIZING POWER CONSUMPTION IN MULTI-SIM MOBILE DEVICE

(71) Applicant: Samsung Electronics Co., Ltd., Suwon-si, Gyeonggi-do (KR)

(72) Inventors: Thirumalli Sureshsah Ramkumar, Bangalore (IN); Diwakar Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/471,719

(22) Filed: Aug. 28, 2014

(65) Prior Publication Data

US 2015/0065132 A1 Mar. 5, 2015

(30) Foreign Application Priority Data

Aug. 29, 2013 (IN) ............... 3851/CHE/2013
Jul. 25, 2014 (IN) ............... 3851/CHE/2013

(51) Int. Cl.
  *H04W 48/16* (2009.01)
  *H04W 52/02* (2009.01)
  *H04W 48/18* (2009.01)

(52) U.S. Cl.
  CPC .......... *H04W 48/16* (2013.01); *H04W 52/0241* (2013.01); *H04W 48/18* (2013.01)

(58) Field of Classification Search
  CPC .. H04W 48/16; H04W 52/0241; H04W 48/18
  See application file for complete search history.

(56) References Cited

U.S. PATENT DOCUMENTS

| 8,433,318 | B2 | 4/2013 | Krishnamoorthy et al. | |
| 2004/0224689 | A1* | 11/2004 | Raghuram et al. | 455/435.3 |
| 2005/0107109 | A1* | 5/2005 | Gunaratnam et al. | 455/525 |
| 2011/0177810 | A1* | 7/2011 | Kim | 455/432.1 |
| 2013/0005290 | A1 | 1/2013 | Geary et al. | |
| 2013/0157662 | A1* | 6/2013 | Han et al. | 455/436 |
| 2015/0017982 | A1* | 1/2015 | Klatt | 455/434 |
| 2015/0141012 | A1* | 5/2015 | Ramkumar et al. | 455/435.3 |

FOREIGN PATENT DOCUMENTS

| JP | 2006-519513 A | 8/2006 |
| KR | 10-2006-0008989 A | 1/2006 |
| KR | 10-2010-0044876 A | 4/2010 |
| KR | 10-2012-0111834 A | 10/2012 |

* cited by examiner

*Primary Examiner* — Don N Vo
*Assistant Examiner* — Eboni Hughes
(74) *Attorney, Agent, or Firm* — Jefferson IP Law, LLP

(57) ABSTRACT

A method and system for operating a multi-Subscriber Identity Module (SIM) mobile device are provided. The method includes determining whether at least one Registered Public Land Mobile Network (RPLMN) among a first RPLMN of a first SIM and a second RPLMN of a second SIM of the multi-SIM mobile device is unavailable to the multi-SIM mobile device when the multi-SIM mobile device triggers a Public Land Mobile Network (PLMN) search, identifying a common PLMN, from a first PLMN set associated with the first SIM and a second PLMN set associated with the second SIM, in response to determining that the at least one RPLMN among the first RPLMN and the second RPLMN is unavailable, and camping on the common PLMN by the first SIM and the second SIM after acquiring camping information of the common PLMN.

36 Claims, 16 Drawing Sheets

METHOD AND SYSTEM FOR OPTIMIZING POWER CONSUMPTION IN MULTI-SIM MOBILE DEVICE

CROSS-REFERENCE TO RELATED APPLICATION(S)

This application claims the benefit under 35 U.S.C. §119(a) of an Indian Patent Application filed in the Indian Patent Office on Jul. 25, 2014, and a Indian Provisional Patent Application filed in the Indian Patent Office on Aug. 29, 2013, both numbered 3851/CHE/2013, the entire disclosures of which are hereby incorporated by reference.

TECHNICAL FIELD

The present disclosure relates to telecommunications. More particularly, the present disclosure relates to optimizing power consumption in a multi-Subscriber Identification Module (SIM) mobile device.

BACKGROUND

The multi-Subscriber Identity Module (SIM) mobile device market is mainly driven by users deliberately desiring to switch between service providers to take advantage of the best deals. Business and professional users appreciate the feature of a multi-SIM mobile device that enables them to have separate mobile numbers for personal and official calls. Currently, most multi-SIM mobile devices typically support dual SIM functionality. However, multi-SIM mobile devices supporting more than two SIMs are now being introduced in the mobile market. Various types of multi-SIM mobile devices such as Dual SIM Single Standby (DSSS), Dual SIM Dual Standby (DSDS), and Dual SIM Dual Active (DSDA) are now available in the market. The DSDA may also be called a dual SIM active mobile device or a multi-SIM active mobile device and can switch between two calls without dropping either call. Typically, two Radio Frequency (RF) transceivers present in the dual SIM active mobile device enable the above feature. Thus, whenever a user is on a call using a mobile number associated with one SIM, the user can still receive calls on the other mobile number associated with the other SIM, as both the SIMs can be active at any given point in time. There is a growing demand for the multi-SIM active mobile devices that provide services on multiple SIMs all the time.

However, power consumption in the multi-SIM active mobile device is a concern as the multiple (typically both) Radio Frequency (RF) transceivers remain active irrespective of the connected mode or idle mode of the multi-SIM active mobile, resulting in high power consumption and faster draining of the battery.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

Accordingly, an aspect of the present disclosure is to provide a method and device for optimizing the power consumption of a multi-Subscriber Identity Module (SIM) mobile device when the multi-SIM mobile device triggers a Public Land Mobile Network (PLMN) search and stays in an idle mode (idle state).

Another aspect of the present disclosure is to provide a method to handle one or more High Priority PLMN (HP-PLMN) timers of the multiple SIMs in the multi-SIM mobile device in order to optimize power consumption.

In accordance with an aspect of the present disclosure, a method for operating a multi-SIM mobile device is provided. The method comprises determining whether at least one Registered PLMN (RPLMN) among a first RPLMN of a first SIM and a second RPLMN of a second SIM of the multi-SIM mobile device is unavailable to the multi-SIM mobile device when the multi-SIM mobile device triggers a PLMN search, identifying a common PLMN from a first PLMN set associated with the first SIM and a second PLMN set associated with the second SIM in response to determining that the at least one RPLMN among the first RPLMN and the second RPLMN is unavailable, and camping on the common PLMN by the first SIM and the second SIM after acquiring camping information of said common PLMN.

In accordance with another aspect of the present disclosure, a multi-SIM mobile device is provided. The mobile device includes at least one processor, a memory, and a Stack Coordinator (SC) module configured to determine whether at least one RPLMN among a first RPLMN of a first SIM and a second RPLMN of a second SIM of the multi-SIM mobile device is unavailable when the multi-SIM mobile device triggers a PLMN search, identify a common PLMN from a first PLMN set associated with the first SIM and a second PLMN set associated with the second SIM in response to determining that at least one RPLMN among the first RPLMN and the second RPLMN is unavailable, and enable the first SIM and the second SIM to camp on the common PLMN by acquiring camping information of the common PLMN.

Other aspects, advantages, and salient features of the disclosure will become apparent to those skilled in the art from the following description, which, taken in conjunction with the annexed drawings, discloses various embodiments of the present disclosure.

Other aspects, advantages, and salient features of the disclosure will become apparent to those skilled in the art from the following description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
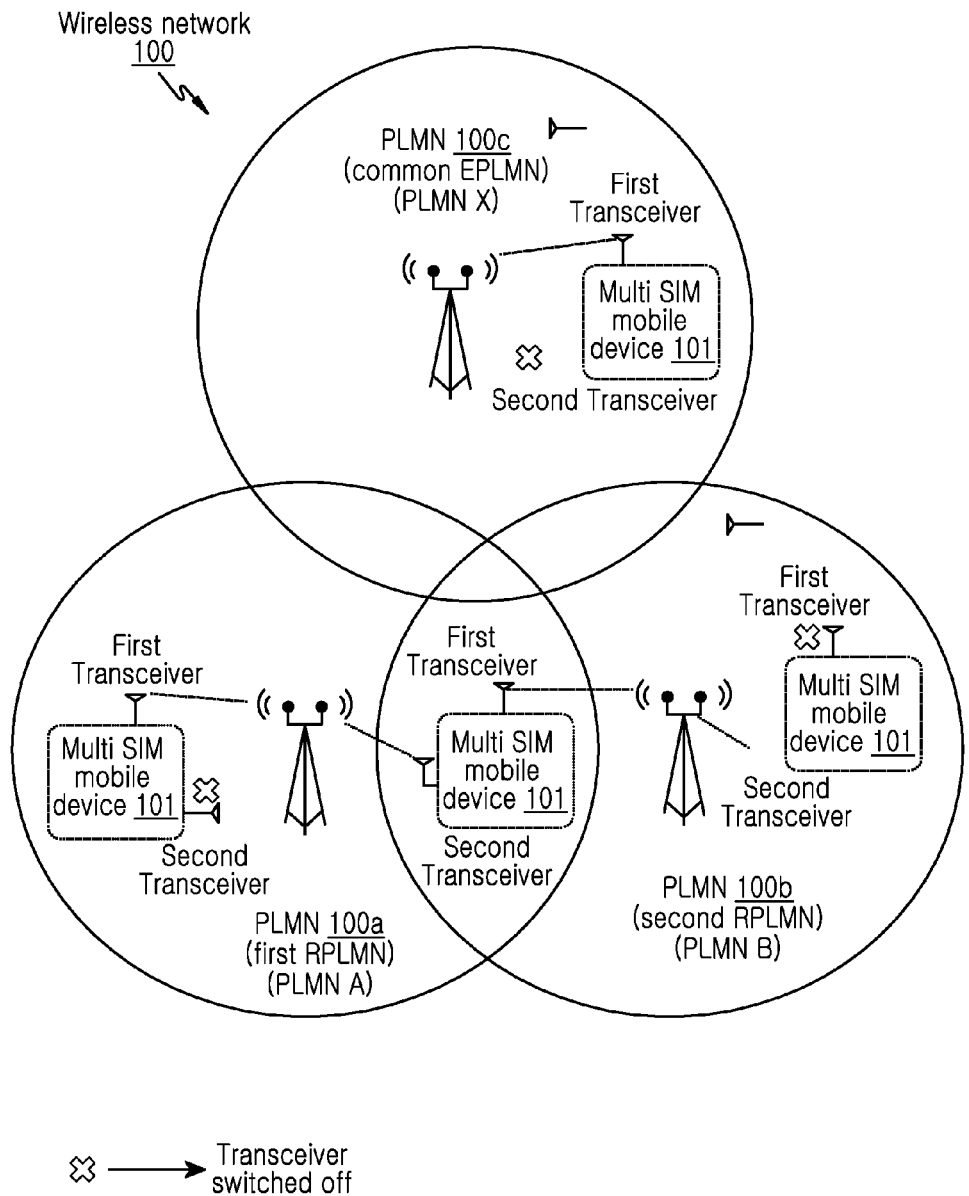
FIG. 1 illustrates a broad overview of a wireless network environment with a multi-Subscriber Identity Module (SIM) mobile device within coverage area of one or more Public Land Mobile Networks (PLMNs), according to embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 15, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

The embodiments disclosed herein achieve a method and system for operating a multi-Subscriber Identity Module (SIM) mobile device (multi-SIM active mobile device) to optimize power consumption.

The method is described with reference to the multi-SIM active mobile device that typically includes dual SIMs. The dual SIMs include a first SIM associated with a first transceiver and a second SIM associated with a second transceiver. The dual SIM active mobile device is a typical example and not a limitation. The method can be extended to multiple SIMs associated with multiple transceivers.

Unlike the existing multi-SIM active mobile devices, typically dual SIM active mobile devices, where both the SIMs and their respective Radio Frequency (RF) transceivers remain active irrespective of whether the dual SIM active mobile device is in idle state or connected state, the method enables the multi-SIM mobile device to efficiently utilize the first transceiver and the second transceiver. The method allows enabling and disabling of the RF transceivers to reduce power consumption in the multi-SIM mobile device (typically when the first SIM (a first SIM card) and the second SIM (a second SIM card) are provided by different Public Land Mobile Network (PLMN) operators.

The method provides a Stack Coordinator (SC) module associated with an SC database. The SC module manages requests to the first SIM and the second SIM for enabling or disabling their associated RF transceivers (the first transceiver and the second transceiver). The SC module requests the SIM associated with the enabled transceiver to perform multitasking by exchanging required information with the PLMN for both the first SIM and the second SIM. Thus, this enables a device to save the power consumed by the currently disabled SIM. The coordination between the first SIM and the second SIM for enabling-disabling the RF transceivers or sharing of the information received by either of the RF transceiver is managed by the SC module by maintaining the information and status of each of the first SIM and the second SIM in the SC database. The SC module coordinates the actions of the first SIM and the second SIM during a camping procedure, registration procedure, sharing of system information and paging information, and handling of High Priority PLMN (HPPLMN) timers. The method defines mechanisms for camping, registration, sharing of system information and paging information and handling of HPPLMN timers that efficiently utilize the RF transceivers and effectively reduce power consumption in the multi-SIM mobile device.

The method describes a plurality of situations that the multi-SIM mobile device experiences in the wireless network when the multi-SIM mobile device receives coverage from one or more PLMNs. The method defines the behavior of the multi-SIM mobile device in the plurality of situations so as to reduce power consumption. In an embodiment, one or more PLMNs in the wireless network can be a Home PLMN (HPLMN), an Equivalent PLMN (EPLMN), a Visiting PLMN (VPLMN), and so on for each of the first SIM and the second SIM.

In an embodiment, the multi-SIM mobile device can be a mobile phone, a tablet, a Personal Digital Assistant (PDA), a laptop, a palm top, or any other communication device capable of supporting multi-SIM functionality.

In an embodiment, the wireless network is a network including Global System for Mobile Communications (GSM), Universal Mobile Telecommunications System (UMTS) Terrestrial Radio Access (UTRA) services, and Evolved UTRA (EUTRA) services provided by a plurality of PLMN operators.

In order to receive an incoming call/Short Message Service (SMS), any mobile communication device such as the multi-SIM mobile device should be listening to a paging channel in its idle state (idle mode). In a cell, single or multiple paging channels may be established. The decision of selecting which paging channel will be used is based on International Mobile Subscriber Identity (IMSI). The method disclosed is based on an assumption that the IMSI of the multiple SIMs in the multi-SIM mobile device are aligned in such a way that protocol stacks associated with each SIM fall in the same paging group.

In a typical example of the dual SIM mobile device, whenever both of the SIMs are camped on the UMTS, IMSIs of both SIMs associated with the corresponding protocol stack are aligned such that the following equations become true.

Assume SIM A and SIM B are the two SIMs of the dual SIM device; then

Paging Occasion of SIM A=Paging Occasion of SIM B,
Paging indicator of SIM A=Paging Indicator of SIM B, and
Index of Selected Secondary Common Control Physical CHannel (SCCPCH) of SIM A=Index of Selected SCCPCH of SIM B.

With the above assumption, the Protocol Stack A associated with SIM A can also receive paging for the Protocol Stack B associated with SIM B, and vice versa.

Throughout the description the terms HPPLMN timer and HPPLMN search timer may be used interchangeably.

Referring now to the drawings, and more particularly to FIGS. 1 through 15, where similar reference characters denote corresponding features consistently throughout the figures, there are shown preferred embodiments.

FIG. 1 illustrates a broad overview of a wireless network 100 environment with a multi-SIM mobile device within the coverage area of one or more PLMNs, according to embodiments of the present disclosure. FIG. 1 depicts the wireless network 100 that includes a plurality of PLMNs provided by a plurality of network operators (PLMN operators). For simplicity of understanding, FIG. 1 depicts only PLMN 100*a*, PLMN 100*b*, and PLMN 100*c*. Each of the PLMNs 100*a*, 100*b*, and 100*c* is capable of providing service to a multi-SIM mobile device 101. The first SIM of the multi-SIM mobile device 101 is subscribed with PLMN 100*a* and the second SIM of the multi-SIM mobile device 101 is subscribed with PLMN 100*b*. Thus, PLMN 100*a* is the HPLMN of the first SIM and the PLMN 100*b* is the HPLMN of the second SIM. The multi-SIM mobile device 101 has two RF transceivers with the first transceiver associated with the first SIM and the second transceiver associated with the second SIM. Moreover, in situations where the operators of both PLMN 100*a* and PLMN 100*b* have an EPLMN agreement with the operator of PLMN 100*c*, then PLMN 100*c* serves the multi-SIM mobile device 101 as an EPLMN. Thus, the PLMN 100*c* is the common EPLMN for both the first SIM and the second SIM.

The wireless network 100 may include other PLMNs, not depicted in FIG. 1 for simplicity, that do not have any EPLMN agreement with the two HPLMNs (PLMN 100*a* and PLMN 100*b*) of the multi-SIM mobile device 101. Thus, these PLMNs do not provide service to the multi-SIM-mobile device 101, except for emergency services.

With the method of the related art, whenever the multi-SIM mobile device 101 powers up or enters a new cell, each of the first SIM and the second SIM triggers a PLMN search. Further, the SIMs attempt to camp on and then register to the last stored Registered PLMN (RPLMN) corresponding to each of the first SIM and the second SIM. Further, the existing methods specify the SIMs to perform camping and registration procedures independently and then enable the first SIM and the second SIM to enter idle state. Further, during the idle state the existing legacy methods specify that the first SIM and the second SIM listen to system information or paging information broadcasted by their current RPLMNs independently through the first transceiver and the second transceiver.

However, the method disclosed enables the multi-SIM mobile device's 101 first SIM and the second SIM to utilize the camping and registration procedures provided by the method that enable efficient utilization of the RF transceivers to reduce and optimize power consumed by the RF transceivers. The enabling and disabling of the RF transceivers is based on availability of one or more common PLMNs in the air of both the first SIM and the second SIM. The available common PLMNs among the first SIM and the second SIM can be:

1. The last stored RPLMN of the first SIM (referred to as a first RPLMN for differentiating between the last stored RPLMN of the first SIM from a last stored RPLMN of the second SIM): In a scenario when the last stored RPLMN of the second SIM (the second RPLMN) is unavailable and the first RPLMN is in the EPLMN list of the second SIM as depicted in FIG. 1, when the multi-SIM mobile device 101 is within the coverage area of PLMN 100*a* but out of the coverage area of PLMN 100*b*, the SC module (not shown) enables the first SIM and the second SIM to camp and register with the first RPLMN. Further, one of the RF transceivers (in FIG. 1, the second transceiver) is disabled and the multi-SIM mobile device 101 listens to the system information and the paging information for the first SIM and the second SIM from the first RPLMN through the other RF enabled (the active first transceiver). The received system information and paging information from the first RPLMN is valid for both the SIMs.

2. The last stored RPLMN of the second SIM (referred to as a second RPLMN for differentiating between the last stored RPLMN of the first SIM and the last stored RPLMN of the second SIM): In a scenario, when the last stored RPLMN of the first SIM (the first RPLMN) is unavailable and the second RPLMN is in the EPLMN list of the first SIM as depicted in FIG. 1, when the multi-SIM mobile device 101 is within the coverage area of PLMN 100b but out of the coverage area of PLMN 100a, the SC module enables the first SIM and the second SIM to camp and register with the second RPLMN through the second transceiver. Further, one of the RF transceivers (in FIG. 1, the first transceiver) is disabled and the multi-SIM mobile device 101 listens to the system information and the paging information for the first SIM and the second SIM from the second RPLMN through the other RF transceiver (in FIG. 1, the second transceiver) that is currently active. The received system information and paging information from the second RPLMN is valid for the SIMs.

3. A common EPLMN among EPLMN list of the first SIM and the EPLMN list of second SIM: In a scenario, when the last stored RPLMN of the first SIM (the first RPLMN) and the last stored RPLMN of the second SIM (second RPLMN) is unavailable the method selects one of the RF transceivers to trigger search for an identified common EPLMN and camp and register on to the common EPLMN. Further, one of the RF transceivers (in FIG. 1, the second transceiver) is disabled and the multi-SIM mobile device 101 listens to the system information and the paging information from the common EPLMN for the first SIM and the second SIM from the common EPLMN through the other enabled RF transceiver (the active first transceiver). Based on the assumption that the IMSI of the multiple SIMs in the multi-SIM mobile device are aligned in such a way that protocol stacks associated with each SIM fall in the same paging group, the received system information and paging information from the common EPLMN is valid for each of the SIMs of the multi SIM mobile device 101. Thus, during the idle state of the multi-SIM mobile device 101, for a maximum of the idle time only one RF transceiver is utilized. This reduces the power consumed by the RF transceivers as compared to the existing method of the related art.

Whenever the common PLMN to which the first SIM and the second SIM are registered during the idle mode is not a HPPLMN for either or both SIMs (typically called VPLMNs), the method defines handling HPPLMN timers for each SIM by the SC module that efficiently uses the RF transceivers to further reduce power consumption.

However, if the first RPLMN and the second RPLMN are available, the first SIM and the second SIM respectively follow the legacy procedure and camp and register to their respective stored RPLMNs.

Figure 2:
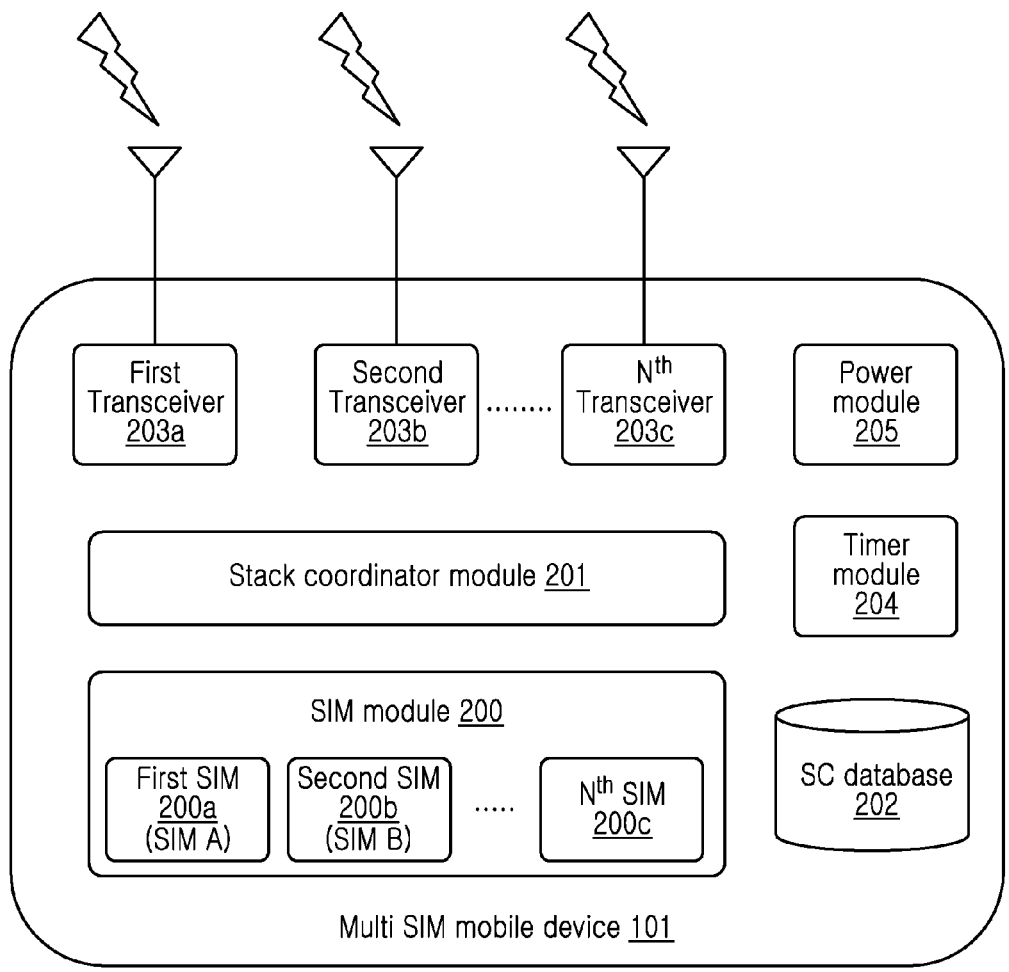
FIG. 2 illustrates various modules present in the multi-SIM mobile device, according to embodiments of the present disclosure.

FIG. 2 illustrates various modules present in the multi-SIM mobile device, according to embodiments of the present disclosure. FIG. 2 depicts the multi-SIM mobile device 101 with a SIM module 200, an SC module 201, an SC database 202, RF transceivers including a first transceiver 203a, a second transceiver 203b, up to an $N^{th}$ transceiver 203c, respectively, a timer module 204, and a power module 205. The SIM module 200 can include a plurality of SIMs such as a first SIM 200a, a second SIM 200b, up to an $N^{th}$ SIM 200c, where each SIM may be subscribed to different PLMN operators in the wireless network 100.

For example, SIM A (the first SIM 200a) is subscribed to the PLMN A (PLMN 100a), SIM B or the second SIM 200b is subscribed with PLMN B (PLMN 100b), an operator of a PLMN X (PLMN 100c) can have an EPLMN agreement with an operator of PLMN A and PLMN B. Each of the SIM A and SIM B is respectively associated with a protocol stack A and a protocol stack B.

In the description any reference to any particular SIM in the SIM module 200 can also be considered as a reference to the corresponding protocol stack. For example, SIM A can be referred as Stack A and SIM B can be referred as Stack B.

Each of the SIMs in the SIM module 200 may communicate with the PLMNs such as PLMN 100a, PLMN 100b, and PLMN 100c in the wireless network 100 through the first transceiver 203a, second transceiver 203b, to the $N^{th}$ transceiver 203c, independently or by utilizing a combination of RF transceivers when the multi-SIM mobile device 101 triggers the PLMN search and further stays in an idle state. The combination of RF transceivers to be used is also based on the availability of the HPLMNs and EPLMNs of the SIMs during the PLMN search triggered by the SIMs. The camping information, the registration information, and the current status of the RF transceivers (such as active status corresponding to an enabled transceiver, or an inactive status corresponding to a disabled transceiver) are maintained in the SC database 202.

The table 1 below lists some of the example functions of the SC module 201 and the information maintained by the SC database 202 for multiple SIMs such as the first SIM 200a and the second SIM 200b:

TABLE 1

| STACK COORDINATOR | | Stack States: |
|---|---|---|
| Functions:<br>1. Camping procedure Coordination<br>2. Registration management<br>3. Sharing Broadcast and paging information.<br>4. HPPLMN Search timer expiry actions. | Database of Both Stacks:<br>1. RPLMN id<br>2. Camped Cell Details<br>3. HPLMN<br>4. Registration status<br>5. RF Active Status<br>6. Stack State<br>7. PLMN id (presently Searching)<br>8. HPPLMN Search Response | 1. Searching for RPLMN/HPLMN<br>2. Camped on RPLMN/HPLMN (Normal Service)<br>3. RPLMN/HPLMN Not available<br>3. List Request in progress<br>4. Searching for EPLMN<br>5. Camped on EPLMN (Normal Service)<br>6. Searching for Limited service<br>7. Camped on limited service<br>8. No Service |

Depending on the actions performed by the multiple SIMs, the SC database 202 will be updated by the corresponding SIM. The SC database 202 is commonly accessible to the multiple SIMs in the SIM module 200.

The SC module 201 coordinates the actions of the first SIM and the second SIM during camping procedure, registration procedure, sharing of system information and paging information, and handling of HPPLMN timers based on the information maintained in the SC database 202. The HPPLMN timers for the first SIM and the second SIM are managed by the SC module 201 module using the timer module 204. The power module 205 includes the battery unit to supply power to the RF transceivers and all other modules in the multi-SIM mobile device 101.

The description of the modules in the multi-SIM mobile device 101 is limited to modules relevant to the embodiments of the invention for simplicity and ease of understanding. However, the multi-SIM mobile device 101 includes various other modules to support additional functionalities and operations of the multi-SIM mobile device 101.

The names of the modules of the multi-SIM mobile device 101 are used for illustrative purposes only and should not be considered as a limitation.

Figure 3A:
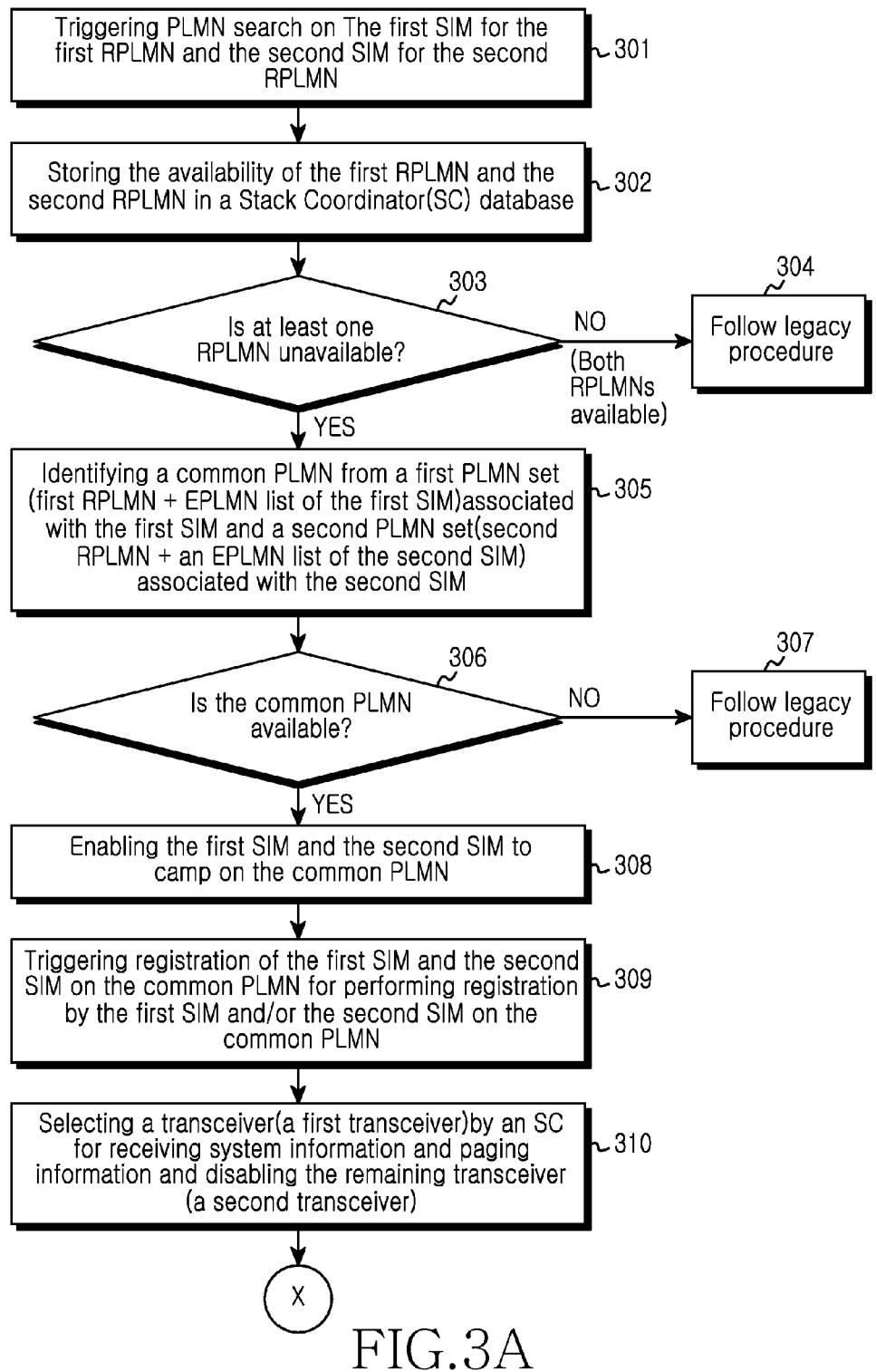
FIGS. 3A and 3B are a flow diagram explaining a method for operating the multi-SIM mobile device to optimize the power consumption, according to embodiments of the present disclosure.
Figure 3B:
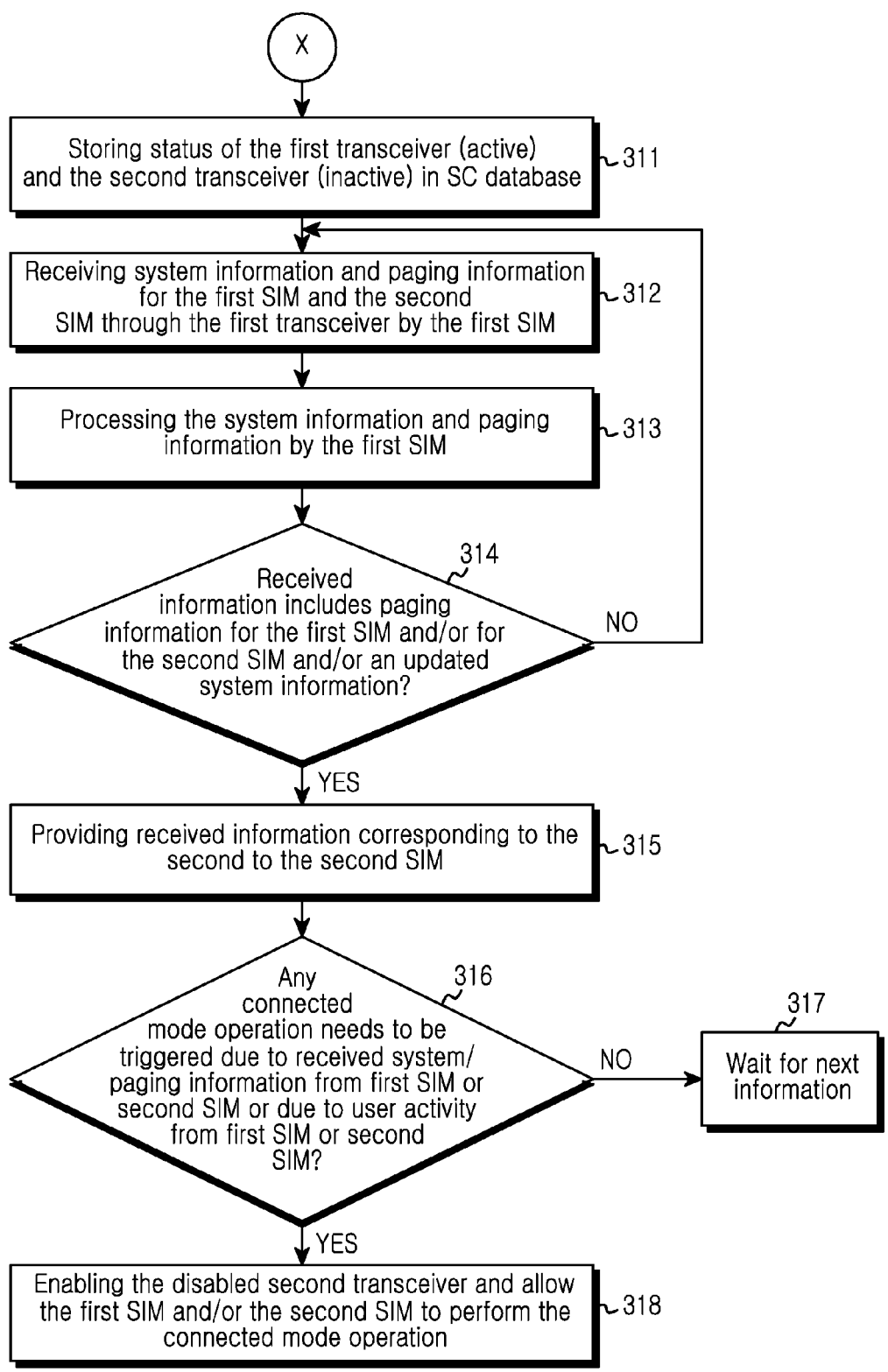

FIGS. 3A and 3B are the flow diagram explaining a method for operating the multi-SIM mobile device to optimize the power consumption, according to embodiments of the present disclosure. Whenever, the multi-SIM mobile device 101 powers up or performs loss of coverage actions, at operation 301, the method includes triggering a PLMN search to detect the availability of a first RPLMN for the first SIM 200a and a second RPLMN for the second SIM 200b. In an embodiment, the method allows the first SIM 200a and the second SIM 200b to detect the availability of the first RPLMN for the first SIM 200a and the second RPLMN for the second SIM 200b. At operation 302, the method includes allowing the first SIM 200a and the second SIM 200b for storing the availability of the first RPLMN and the second RPLMN in the SC database 202 based on the response received for the triggered PLMN search. At operation 303, the method includes configuring the SC module 201 to determine whether any among the first RPLMN or the second RPLMN is unavailable. If, at operation 303, it is determined that the both the first RPLMN and the second RPLMN are available, then, at operation 304, the method follows the related art procedure and allows the first SIM and the second SIM to camp and register on their respective RPLMNs. At operation 305, the method includes configuring the SC module 201 for identifying the common PLMN from a first PLMN set associated with the first SIM 200a and a second PLMN set associated with the second SIM 200b. The first PLMN set includes the first RPLMN and an EPLMN list of the first SIM 200a. The second PLMN set includes the second RPLMN and an EPLMN list of the second SIM 200b. On identifying the common PLMN, at operation 306, the method includes configuring the SC module 201 to determine whether the identified common PLMN is available. In response to determining that the common PLMN is unavailable, at operation 307, the method includes configuring the SC module 201 to follow the related art procedure.

In response to determining that the common PLMN is available, at operation 308, the method includes enabling the first SIM and the second SIM to camp on the common PLMN when the common PLMN is available. The multiple embodiments of the camping procedure provided by the method are described in more detail in FIG. 4 and FIG. 5. Once the first SIM 200a and the second SIM 200b camp on the common PLMN, the camping details are updated by the first SIM and the second SIM in the SC database 202 corresponding to each SIM.

For example, if the identified common PLMN is the second RPLMN (PLMN B) available and which is in the EPLMN list of SIM A (when the first RPLMN or PLMN A is unavailable) the current SC database 202 updates after camping are provided in table 2 below:

TABLE 2

| Stack A | Stack B |
|---|---|
| Stack State: Camped on EPLMN | Stack State: Camped on RPLMN |
| RPLMNid: PLMN B | RPLMNid: PLMN B |
| Camped Cell | Camped Cell |
| Details: PLMN B Cell details | Details: PLMN B Cell details |

At operation 309, the method includes configuring the SC module 201 for triggering registration of the first SIM 200a and the second SIM 200b on the common PLMN in response to both SIMs camped on the common PLMN. Further, the method includes allowing the first SIM 200a and the second SIM 200b for performing registration by the first SIM and the second SIM in response to the triggering of registration procedure. The registration for both the SIMs can be performed by each SIM individually through their respective RF transceivers or by a single SIM through the RF transceiver corresponding to the particular SIM. Once the registration is completed, the method allows the first SIM 200a and the second SIM 200b to update the SC database 202 accordingly.

For example, the current SC database 202 updates registration status of each SIM A and SIM B is provided in table 3 below:

TABLE 3

| SC Database got updated | |
|---|---|
| Stack A | Stack B |
| Registration status: Registered | Registration status: Registered |

At operation 310, the method includes configuring the SC module 201 to select one of the RF transceiver among the first transceiver 203a and the second transceiver 203b for receiving system information and paging information for both the SIMs. For example, if the SC module 201 selects the first transceiver 203a, the method includes disabling the remaining second transceiver 203b. At operation 311, the method includes configuring the SC module 201 for storing status of the first transceiver 203 as active and the status of the second transceiver 203b as inactive in SC database 202. At operation 312, the method includes allowing the first SIM 200a to receive system information and paging information from the common PLMN for the first SIM and the second SIM through the first transceiver 203a by the first SIM 200a. At operation 313, the method includes allowing the first SIM 200a to process the system information and paging information. At operation 314, the method includes allowing the first SIM to determine whether the received information includes paging information for the first SIM 200a and/or for the second SIM 200b and/or updated system information. If, at operation 314, the received information does not include paging information for the second SIM or updated system information, the method allows the first SIM 200a to continue receiving information. If, at operation 314, the received information includes paging information for the second SIM or updated system information, then the method includes allowing the first SIM 200a to update the changes in the received information in the SC database 202. Further, at operation 315, the method includes configuring the SC module 201 to provide the received updated information corresponding to the second SIM 200b to the second SIM 200b.

For example, the current SC database 202 updates of received system information and paging information for SIM A and SIM B are provided in table 4 below:

TABLE 4

| SC Database got updated | |
| --- | --- |
| Stack A | Stack B |
| Broadcast and Paging Information: Updated | RF Active Status: Inactive |

At operation 316, the method includes configuring the SC module 201 to determine whether any connected mode operation needs to be triggered due to received system/paging information from the first SIM or second SIM or due to user activity from the first SIM or second SIM. If, at operation 316, it is determined that the connected mode operation is not required to be performed, then, at operation 317, the method includes configuring SC module 201 to wait for next received information. If, at operation 316, it is determined that the connected mode operation is required to be performed, then, at operation 318, the method includes configuring SC module 201 to enable the disabled second transceiver 203b and updating the SC database 202 accordingly. For example some user activity such as a user trying to access the interne or dialing a phone number (mobile originated call) requires the connected mode operation. Similarly, a user receiving a call (mobile terminated call) requires the connected mode operation.

For example, the current SC database 202 updates for SIM B (whose RF transceiver was initially disabled) after detecting the connected mode operation due to received system information and/or paging information or user activity from either the first SIM or the second SIM is provided in table 5 below:

TABLE 5

| SC Database got updated | |
| --- | --- |
| Stack A | Stack B |
| NA | RF Active Status: Active |

Further, the method includes allowing the first SIM 200a and/or the second SIM 200b to perform the connected mode operation through their respective RF transceiver.

The various actions, acts, blocks, steps, and the like in the method of FIGS. 3A and 3B may be performed in the order presented, in a different order or simultaneously. Further, in some embodiments, some actions, acts, blocks, steps, and the like may be omitted, added, modified, skipped, and the like without departing from the scope of the invention.

The selection of the first transceiver for receiving system information and paging information for the first SIM and the second SIM is an example, and the steps explained above after selection of the first transceiver can be applied in similar context for the second SIM and the second transceiver when the SC module 201 selects the second transceiver.

Figure 4:
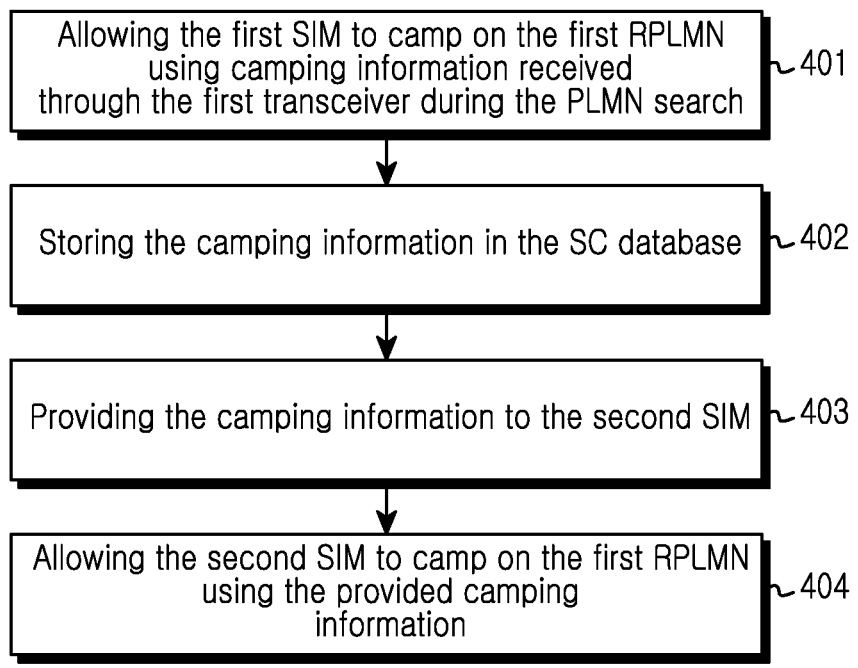
FIG. 4 is a flow diagram explaining a method for camping on a common PLMN when the common PLMN is a first Registered PLMN (RPLMN) of a first SIM in the multi-SIM mobile device, according to embodiments of the present disclosure.

FIG. 4 is a flow diagram explaining a method for camping on the common PLMN when the common PLMN is the first RPLMN of the first SIM in the multi-SIM mobile device, according to embodiments of the present disclosure. As described in FIG. 1, the common PLMN can be either the first RPLMN or the second RPLMN based on the availability of the RPLMNs experienced by the multi-SIM active mobile device. The method describes the steps in context of first transceiver 203a, the first SIM 200a, and first RPLMN with the assumption that the first RPLMN is available and the second RPLMN is unavailable. However, the method is equally applicable in the context of second transceiver 203b, the second SIM 200b and the second RPLMN when the second RPLMN is available and the first RPLMN is unavailable.

At operation 401, the method includes allowing the first SIM to camp on the first RPLMN using camping information received through the first transceiver during triggered PLMN search of the first SIM 200a. At operation 402, the method includes allowing the first SIM 200a to store the camping information in the SC database 202. At operation 403, the method includes configuring the SC module 201 to provide the camping information from the SC database 202 to the second SIM. At operation 404, the method includes allowing the second SIM to camp on the first RPLMN using the camping information provided by the SC database 202 without the need to acquire the camping details through the second transceiver by triggering the PLMN search.

The various actions, acts, blocks, steps, and the like in the method of FIG. 4 may be performed in the order presented, in a different order, or simultaneously. Further, in some embodiments, some actions, acts, blocks, steps, and the like may be omitted, added, modified, skipped, and the like without departing from the scope of the invention.

Figure 5:
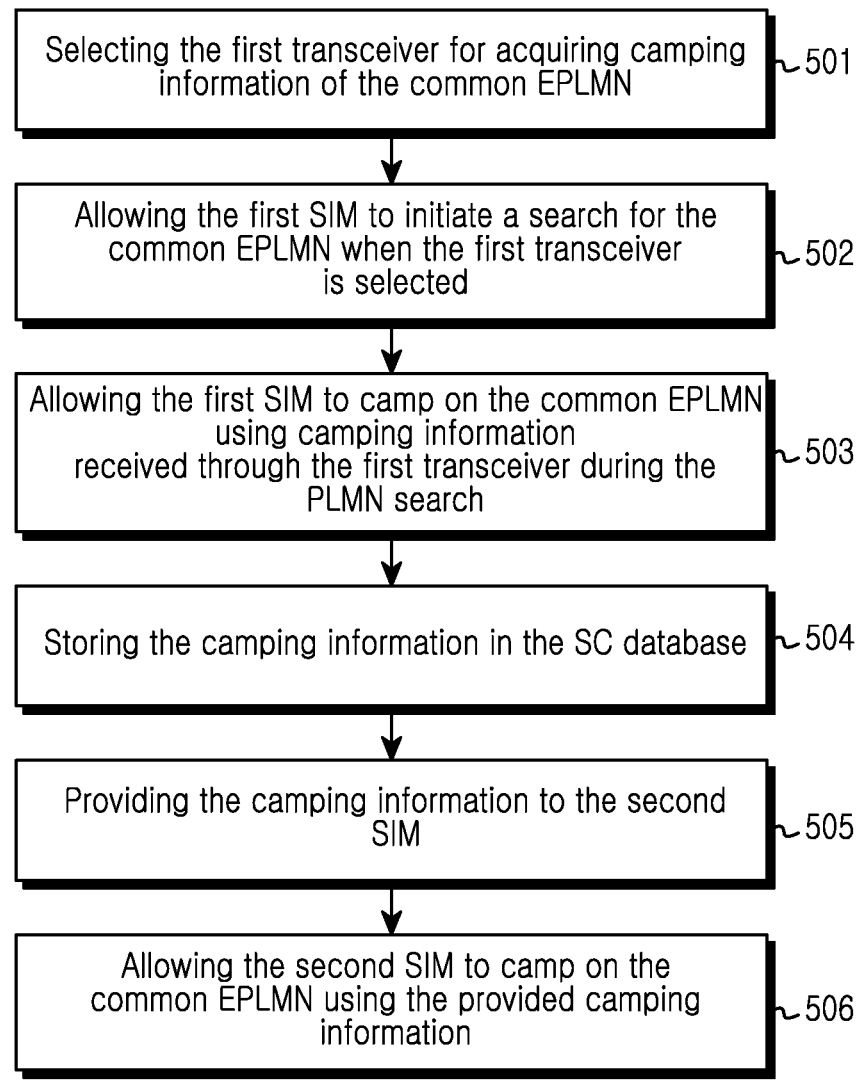
FIG. 5 is a flow diagram explaining a method for camping on the common PLMN when the common PLMN is a common Equivalent PLMN (EPLMN) of the first SIM and a second SIM in the multi-SIM mobile device, according to embodiments of the present disclosure.

FIG. 5 is the flow diagram explaining a method for camping on the common PLMN when the common PLMN is the common EPLMN of the first SIM and the second SIM in the multi-SIM mobile device, according to embodiments as disclosed herein. As described in FIG. 1, the common PLMN can be the common EPLMN if the corresponding stored last RPLMNs of the first SIM 200a and the second SIM 200b are unavailable. The method describes the steps in the context of first transceiver 203a, the first SIM 200a, and first RPLMN 100a with the assumption that the first transceiver is selected for the camping procedure for both the first SIM 200a and the second SIM 200b on the common EPLMN (PLMN 100c). However, the method is equally applicable in context of selection of the second transceiver 203b.

At operation 501, the method includes configuring the SC module 201 to select the first transceiver 203a for acquiring camping information of the common EPLMN. At operation 502, the method includes configuring the SC module 201 to allow the first SIM 203a to initiate a search for the common EPLMN when the first transceiver 203a is selected. At operation 503, the method includes allowing the first SIM 200a to camp on the common EPLMN. The camping is performed using camping information received through the first transceiver 203a during the triggered PLMN search. At operation 504, the method includes allowing the first SIM 200a to store the camping information in the SC database 202.

For example, the current SC database updates by SIM A after camping on the common EPLMN, PLMN X (the PLMN 100c), is provided in table 6 below:

TABLE 6

| SC Database got updated | |
| --- | --- |
| Stack A | Stack B |
| Stack State: Camped on EPLMN<br>RPLMN id: PLMN X<br>Camped Cell<br>Details: PLMN X Cell Details | NA |

At operation 505, the method includes configuring the SC module 201 for providing the camping information to the second SIM 200b from the SC database 202. At operation 506, the method includes configuring the SC module 201 for allowing the second SIM 200b for camping on the common EPLMN (PLMN 100c) using the provided camping information. The various actions, acts, blocks, steps, and the like in the method of FIG. 5 may be performed in the order presented, in a different order, or simultaneously. Further, in some embodiments, some actions, acts, blocks, steps, and the like may be omitted, added, modified, skipped, and the like without departing from the scope of the invention.

Figure 6:
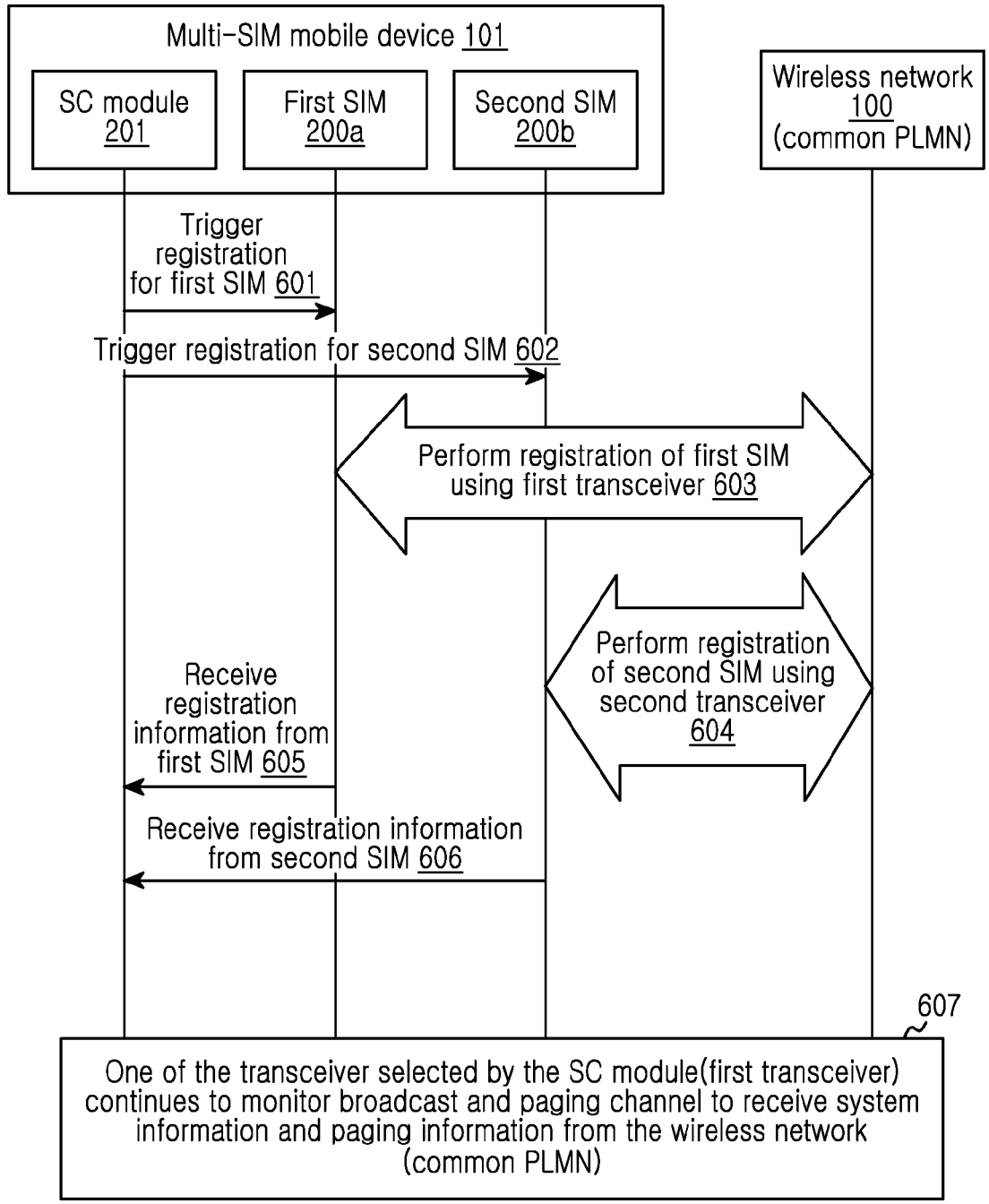
FIG. 6 is a sequence diagram illustrating registration of the first SIM and the second SIM with the common PLMN separately through a first transceiver and a second transceiver, according to embodiments of the present disclosure.

FIG. 6 is a sequence diagram illustrating registration of the first SIM and the second SIM with the common PLMN separately through the first transceiver and the second transceiver, according to embodiments of the present disclosure. The figure depicts the multi-SIM mobile device 101 including the SC module 201, the first SIM 200a, and the second SIM 200b. FIG. 6 also depicts the wireless network 100 with the common PLMN. Upon completion of the camping procedure by both SIMs, the SC module 201 triggers, at operations 601 and 602, registration separately for each of the first SIM 200a and the second SIM 200b, respectively. On receiving the trigger indication each of the first SIM 200a and the second SIM 200b performs, at operations 603 and 604, registration on to the identified common PLMN which is available through the first transceiver and the second transceiver, respectively. Once the first SIM 200a and the second SIM 200b are registered, the SC module 201 receives, at operations 605 and 606, registration information from each of the first SIM 200a and the second SIM 200b, respectively, and the information is updated in the SC database 202. Once the registration of both SIMs is completed, one of the RF transceiver selected by the SC module 201 (for example, the first transceiver 203a) continues to monitor broadcast and paging channel to receive the system information and the paging information from the wireless network 100 (common PLMN) in operation 607, as has been described in the method of FIGS. 3A and 3B. The SC module 201 switches off the second transceiver, thus reducing the power consumption of the multi SIM mobile device 101.

Figure 7:
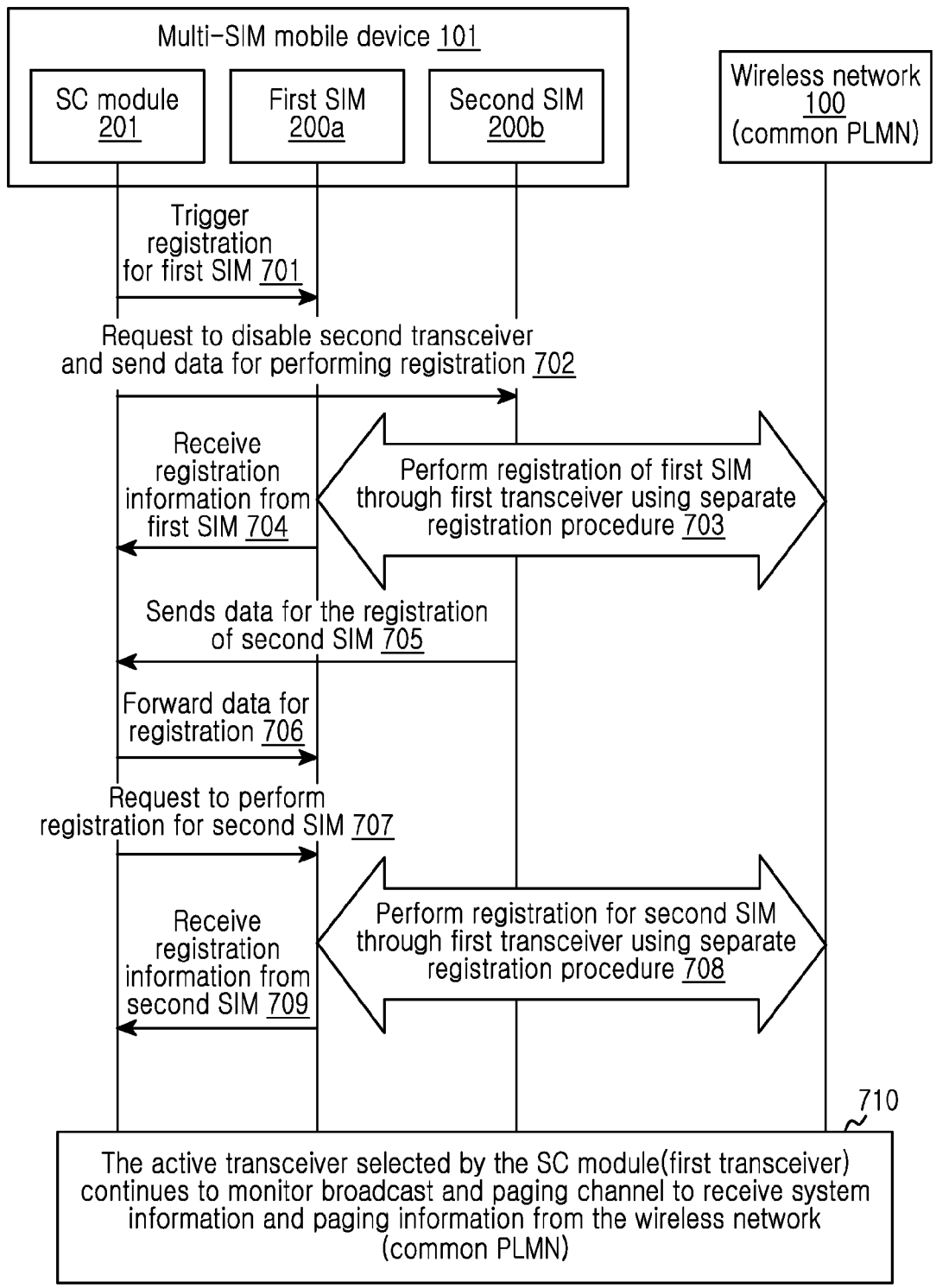
FIG. 7 is a sequence diagram illustrating registration of the first SIM and the second SIM with the common PLMN through a single Radio Frequency (RF) transceiver using a sequential registration procedure for each of the first SIM and the second SIM, according to embodiments of the present disclosure.

FIG. 7 is a sequence diagram illustrating registration of the first SIM and the second SIM with the common PLMN through a single RF transceiver using the sequential registration procedure for each of the first SIM and the second SIM, according to embodiments of the present disclosure. FIG. 7 depicts the multi-SIM mobile device 101 including the SC module 201, the first SIM 200a, and the second SIM 200b. FIG. 7 also depicts the wireless network 100 with the common PLMN available. Upon completion of the camping procedure by both SIMs, the SC module 201 triggers, at operation 701, registration for the first SIM 200a as it selects the first transceiver for performing the registration procedure for both SIMs. Then, the SC module 201 requests, at operation 702, the second SIM 200b to disable the second transceiver 203b and send data for performing registration to the SC module 201. The first SIM 200a performs, at operation 703, registration through first transceiver that has current active status. The registration is performed using a separate registration procedure for the first SIM 200a. Once the registration of the first SIM 200a is completed, the SC module 201 receives, at operation 704, registration information from the first SIM 200a to be stored in the SC database 202.

Thereafter, the second SIM 200b sends, at operation 705, data for performing the registration through the first transceiver 203a. The data for registration can be maintained in the SC database 202. The SC module 201 forwards, at operation 706, the data for registration to the first SIM 200a. Further, the SC module 201 requests, at operation 707, the first SIM 200a to perform registration for the second SIM 200b. Further, the first SIM 200a performs, at operation 708, registration for the second SIM 200b through the first transceiver 203a using a separate registration procedure for the second SIM 200b. Once the registration of the second SIM 200b is completed, the SC module 201 receives, at operation 709, registration information from the second SIM 200b. Further, the active transceiver selected by the SC module 201 (for example, the first transceiver 203a) continues, at operation 710, to monitor broadcast and paging channel to receive paging information and system information from the wireless network 100 (common PLMN).

Figure 8:
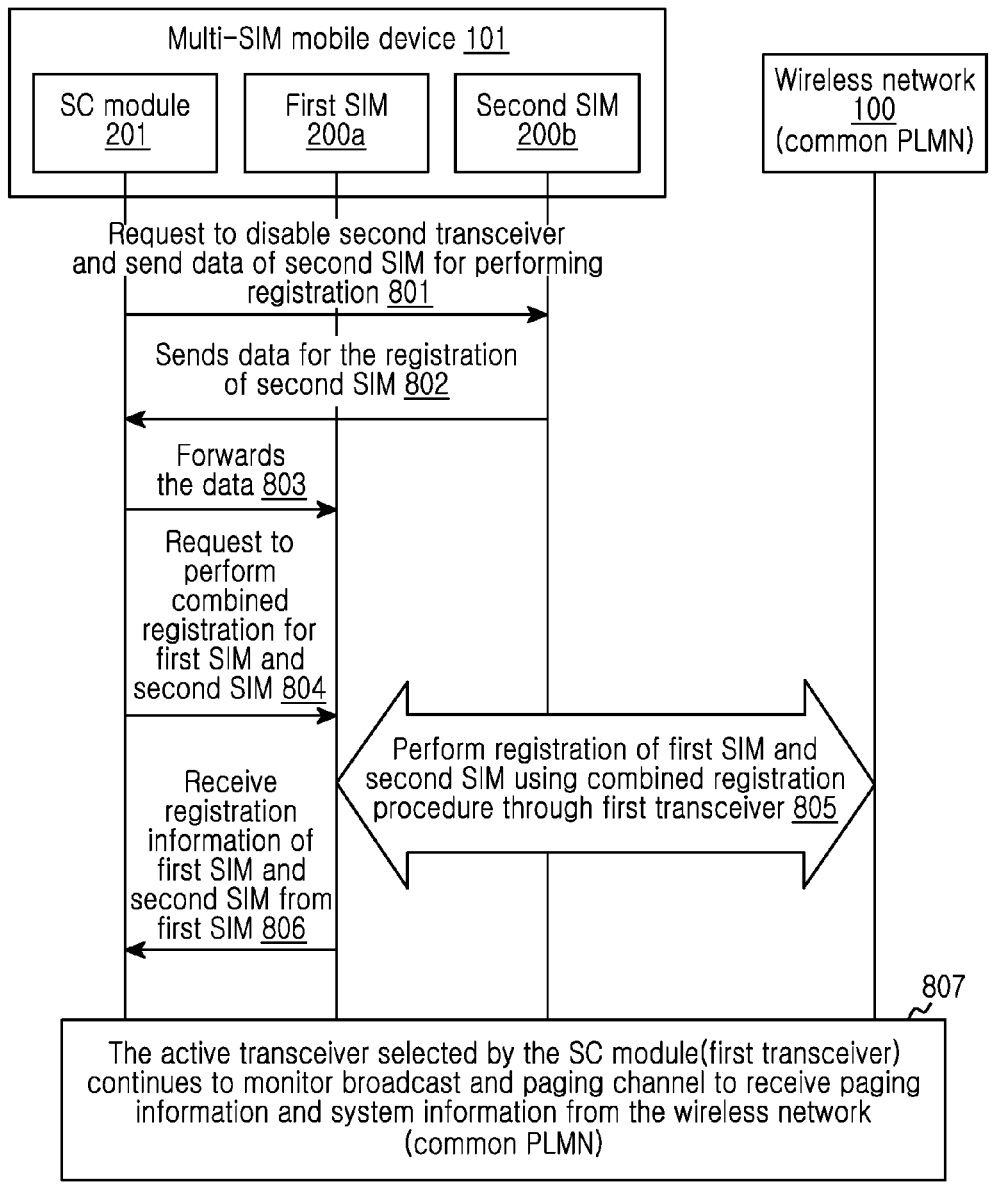
FIG. 8 is a sequence diagram illustrating registration of the first SIM and the second SIM with the common PLMN through the single transceiver using a combined registration procedure for the first SIM and the second SIM, according to embodiments of the present disclosure.

FIG. 8 is a sequence diagram illustrating registration of the first SIM and the second SIM with the common PLMN through the single transceiver using the combined registration procedure for the first SIM and the second SIM, according to embodiments of the present disclosure. FIG. 8 depicts the multi-SIM mobile device 101 including the SC module 201, the first SIM 200a, and the second SIM 200b. FIG. 8 also depicts the wireless network 100 with the common PLMN available. Upon completion of the camping procedure by both SIMs, the SC module 201 requests, at operation 801, the second SIM 200b to disable the second transceiver 203a and requests to send data of second SIM 200a for performing registration of the second SIM 200a as the SC module 201 selects the first transceiver 203a for a registration procedure. The second SIM 200b sends, at operation 802, data for the registration of the second SIM 200b to the SC module 201 which is maintained in the SC database 202.

For example, the current SC database updates by SIM B after sending data for registration, is provided in table 7 below:

TABLE 7

| SC Database got updated | |
| --- | --- |
| Stack A | Stack B |
| NA | Info. Needed for Registration:<br>Updated<br>RF Active Status: Inactive |

The SC module 201 forwards, at operation 803, the data for registration of the second SIM maintained in the SC database 202, to the first SIM 200a. Further, the SC module 201 requests, at operation 804, the first SIM to perform the combined registration for first SIM 200a and the second SIM 200b. The first SIM 200a performs, at operation 805, registration of first SIM 200a and second SIM 200b through the first transceiver using the combined registration procedure. The combined registration includes simultaneously performing the registration of the first SIM 200a and the second SIM 200b on the common PLMN through the first transceiver. The request for combined registration for first SIM 200a and second SIM 200b is sent to the wireless network 100 (the common PLMN) in a single registration message by the first SIM through the first transceiver. The wireless network 100 responds to the registration message by sending the response to the registration message for the first SIM 200a and the second SIM 200b in a single response message.

The SC module 201 then receives, at operation 806, the registration information of first SIM 200a and second SIM 200b from the first SIM 200a. The active transceiver selected by the SC module 201 (first transceiver) continues, at operation 807, to monitor broadcast and paging channel to receive paging information and system information from the wireless network 100 (common PLMN).

Figure 9:
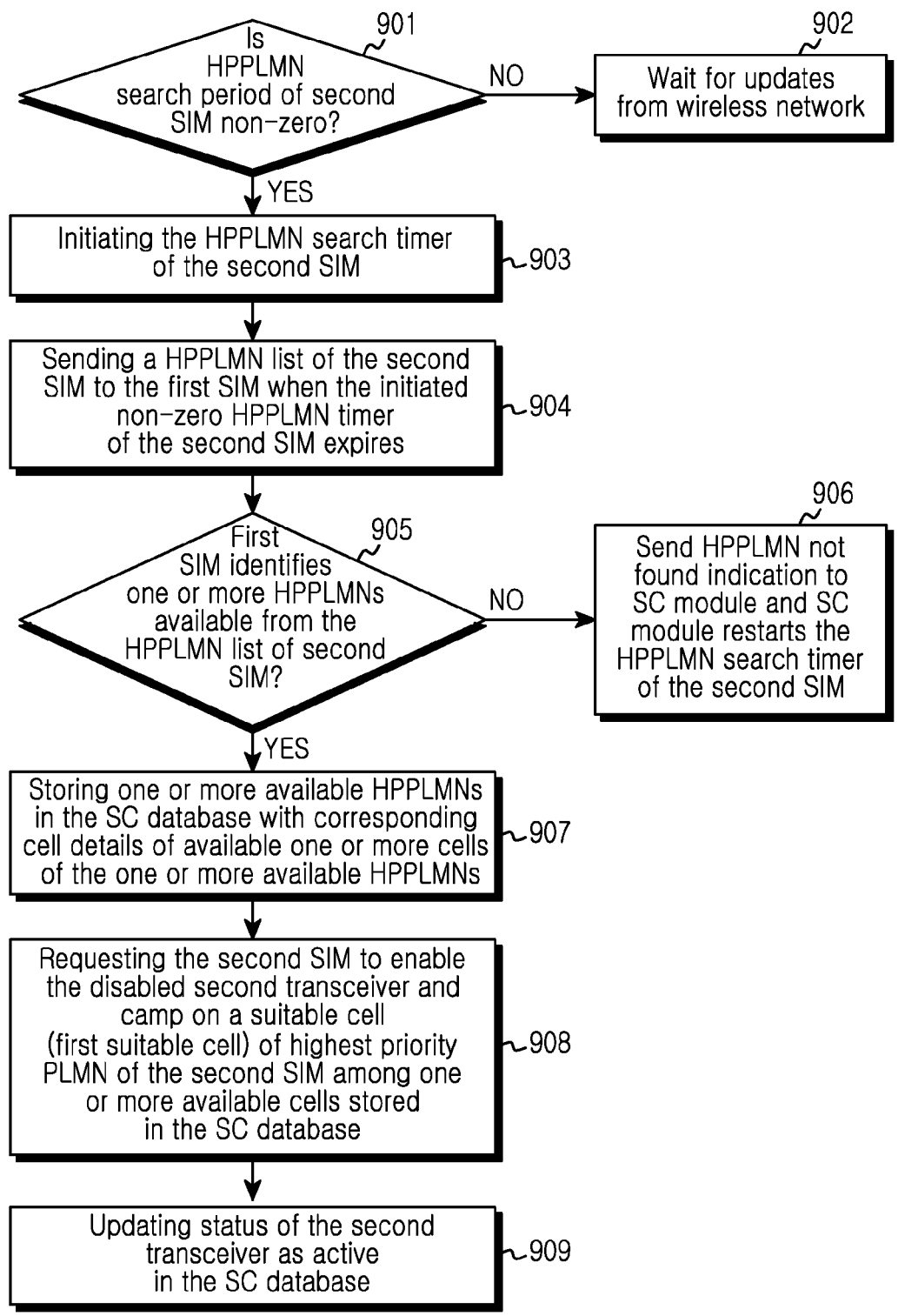
FIG. 9 is a flow diagram explaining a method for handling High Priority PLMN (HPPLMN) timers for the first SIM and the second SIM when a common PLMN to which the first SIM and the second SIM are registered is an RPLMN associated with either the first SIM or the second SIM which is the HPPLMN of the first SIM and not the HPPLMN of the second SIM, according to embodiments of the present disclosure.

FIG. 9 is a flow diagram explaining a method for handling High Priority PLMN (HPPLMN) timers for the first SIM and the second SIM when a common PLMN to which the first SIM and the second SIM are registered is an RPLMN associated with the first SIM, and which is the HPPLMN of the first SIM and not the HPPLMN of the second SIM, according to embodiments of the present disclosure. Since the second SIM 200b is out of coverage of its HPPLMN (second RPLMN), the HPPLMN search timer for second SIM 200b must be initiated. For this example, the current information maintained in the SC database 202 includes:

First transceiver 203a: RF transceiver active,
Second transceiver 203b: RF transceiver inactive (switched off),
Registration status: first SIM: Registered, Second SIM: Registered,
First SIM (SIM A) state: Camped on HPLMN (Normal service), and
Second SIM (SIM B) state: Camped on EPLMN (Normal service).

At operation 901, the method includes configuring the SC module 201 to detect whether an HPPLMN search period defined for the HPPLMN search timer associated with the second SIM 200b is non-zero. If it is determined, at operation 901, that the HPPLMN search period is zero, the method allows the second SIM 200b to wait for updates from wireless network 100. If it is determined, at operation 901, that the HPPLMN search period is non-zero, at operation 902, the method includes configuring the SC module 201 to initiate the HPPLMN timer for the second SIM 200b using the timer module 204. Once the initiated HPPLMN timer for the second SIM 200b expires, at operation 904, the method includes configuring the SC module 201 to send a HPPLMN list of the second SIM 200b to the first SIM 200a. At operation 905, the method includes allowing the first SIM 200a to determine whether one or more HPPLMNs from the HPPLMN list of the second SIM 200b is available. If it is determined, at operation 905, that the HPPLMN is not available, then, at operation 906, the method includes allowing the first SIM 200a to send an HPPLMN not found indication to the SC module 201. Further, the SC module 201 restarts the HPPLMN search timer of the second SIM 200b. If it is determined, at operation 905, that the HPPLMN is available, then, at operation 907, the method includes allowing the first SIM 200a to store one or more available HPPLMNs in the SC database 202 with corresponding cell details of one or more available cells of the one or more available HPPLMNs.

At operation 908, the method includes configuring the SC module 201 to request the second SIM 200b to enable the disabled second transceiver and camp on a suitable cell (first suitable cell) of a highest priority PLMN of the second SIM among one or more available cells stored in the SC database 202.

The usage of term "first suitable cell" is only for distinguishing the suitable cell of the highest priority PLMN selected at this point from one or more other suitable cells of the highest priority PLMN described at their points in the description. Also, the term "first" does not indicate any priority for the suitable cell being selected.

At operation 909, the method includes configuring the SC module 201 to update the status of the second transceiver 203b in the SC database 202. Further, the second SIM 200b follows the related art procedure as specified in the specification.

For example, the current updated SC database 202 for the second SIM
(SIM B) can be:
RPLMN Id: PLMN B,
Camped Cell Details: PLMN B cell details,
Registration Status: Registered,
RF transceiver status: Active, and
SIM state (stack state): camped on HPLMN.

The various actions, acts, blocks, steps, and the like in the method of FIG. 9 may be performed in the order presented, in a different order, or simultaneously. Further, in some embodiments, some actions, acts, blocks, steps, and the like may be omitted, added, modified, skipped, and the like without departing from the scope of the invention.

The method remains same for handling the HPPLMN timer for the first SIM 200a for the reverse case when the common PLMN to which the first SIM and the second SIM are registered is an RPLMN associated with the second SIM and which is the HPPLMN of the second SIM but not the HPPLMN of the first SIM. In this case, the method is followed in the context of the second SIM 200b and is not further explained to avoid repetition.

In an embodiment, when an HPPLMN search period for the first SIM or the second SIM is zero, then either of first SIM or the second SIM which has the HPPLMN search period as non-zero may start the HPPLMN search timer.

Figure 10:
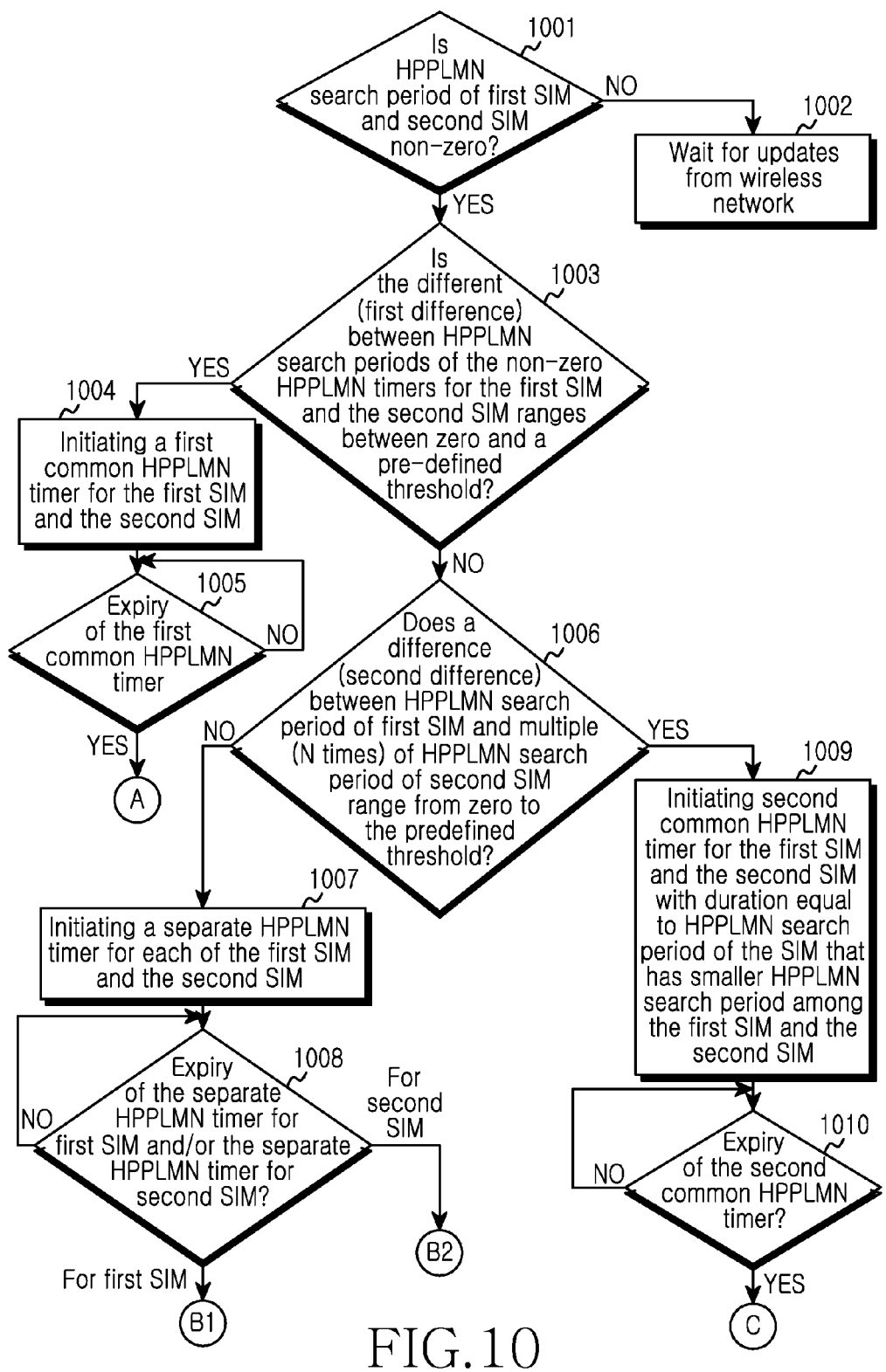
FIG. 10 is a flow diagram explaining a method for handling HPPLMN timers for the first SIM and the second SIM when a common PLMN to which the first SIM and the second SIM are registered is the common EPLMN and the common EPLMN is not a HPPLMN of the first SIM and the second SIM, according to embodiments of the present disclosure.

FIG. 10 is a flow diagram explaining a method for handling High Priority PLMN (HPPLMN) timers for the first SIM and the second SIM when a common PLMN to which the first SIM and the second SIM are registered is the common EPLMN and the common EPLMN is not an HPPLMN of the first SIM and the second SIM, according to embodiments of the present disclosure. As both the SIMs are out of the coverage areas of their respective HPLMNs the HPPLMN timers must be initiated for both SIMs.

For the above example the current SC database 202 status of both SIMs (SIM A and SIM B) is provided in table 8 below with the assumption that currently the RF transceiver of SIM A is active:

TABLE 8

| STACK A: | STACK B: |
| --- | --- |
| Stack state: camped on EPLMN (Normal Service) | Stack state: camped on EPLMN (Normal Service) |
| Registration status: Registered | Registration status: Registered |
| RF active status: Active | RF active status: Inactive |

At operation 1001, the method includes configuring the SC module 201 to detect whether an HPPLMN search period defined for the first SIM 200a and the second SIM 200b is non-zero. If it is determined at operation 1001, that the HPPLMN search period is zero, at operation 1002, the method allows the first SIM 200a and the second SIM 200b to wait for updates from the wireless network 100. If it is determined, at operation 1001, that the HPPLMN search period for both the SIMs is non-zero, then, at operation 1003, the method includes determining whether the difference between the HPPLMN search period for the first SIM 200*a* and the HPPLMN search period for the second SIM 200*b* ranges between zero and a pre-defined threshold. If it is determined, at operation 1003, that the difference between the HPPLMN search period for the first SIM 200*a* and the second SIM 200*b* ranges between zero and the pre-defined threshold, then, at operation 1004, the method includes configuring the SC module 201 to initiate the first common timer for both the first SIM 200 and the second SIM 200*b*. The common timer initiated by the SC module 201 when the HPPLMN search period for the first SIM 200*a* and the second SIM 200*b* ranges between zero and the pre-defined threshold is called a first common timer.

The term "first" associated with the common HPPLMN timer is used to distinguish between other second common HPPLMN timers described later. The terms "first" or "second" associated with the common HPPLMN timer do not specify any priority herein.

At operation 1005, the method includes configuring the SC module 201 to check for expiration of the first common HPPLMN timer. If it is determined, at operation 1005, that the first common HPPLMN timer has expired, the method includes configuring the SC module 201 to perform the steps described later in the FIG. 11. If it is determined, at operation 1003, that the difference (first difference) between the HPPLMN search periods for the first SIM 200*a* and the second SIM 200*b* is non-zero and above the pre-defined threshold, the method includes configuring the SC module 201 to perform operation 1006.

At operation 1006, the method includes configuring the SC module 201 to determine whether a difference (second difference) between an HPPLMN search period of the first SIM and a multiple N of an HPPLMN search period of the second SIM ranges between zero and the pre-defined threshold. For this example, when the duration of the HPPLMN search period of first SIM 200*a* is greater than the duration of the HPPLMN search period of the second SIM 200*b*, then N indicates the value of the multiple by which the HPPLMN search period of the first SIM 200*a* is greater than that of the second SIM 200*b*.

If it is determined, at operation 1006, that the difference between the HPPLMN search period of the first SIM and the multiple N of the HPPLMN search period of the second SIM is above the pre-defined threshold, then, at operation 1007, the method includes configuring the SC module 201 to initiate the separate HPPLMN timer for each of the first SIM and the second SIM. At operation 1008, the method includes checking for expiration of the separate HPPLMN timer for first SIM and/or the separate HPPLMN timer for second SIM. If, at operation 1008, it is determined that the separate HPPLMN timer for the first SIM has expired, the method includes configuring the SC module 201 to perform steps as described in FIG. 12. If, at operation 1008, it is determined that the separate HPPLMN timer for the second SIM has expired, the method includes configuring the SC module 201 to perform steps as described in FIG. 13.

If it is determined, at operation 1006, that the difference between the HPPLMN search period of the first SIM and the multiple N of the HPPLMN search period of the second SIM ranges from zero to the pre-defined threshold, then, at operation 1009, the method includes configuring the SC module 201 to initiate the second common HPPLMN timer for the first SIM 200*a* and the second SIM 200*b*. The duration of the second common HPPLMN timer equals to the HPPLMN search period of the SIM that has a smaller HPPLMN search period among the first SIM and the second SIM. At operation 1010, the method includes configuring the SC module to check the expiration of the second common HPPLMN timer.

If, at operation 1010, it is determined that the second common HPPLMN search timer has expired, then the method includes configuring the SC module 201 to perform steps as described later in FIG. 14.

The various actions, acts, blocks, steps, and the like in the method of FIG. 10 may be performed in the order presented, in a different order, or simultaneously. Further, in some embodiments, some actions, acts, blocks, steps, and the like may be omitted, added, modified, skipped, and the like without departing from the scope of the invention.

The predefined threshold for the deciding whether the first common HPPLMN timer or separate HPPLMN timers must be initiated can be computed using the following criteria:

Absolute value of {*HPPLMN* Search period of *SIM A* (first *SIM*)−*HPPLMN* Search period of the *SIM* B (second *SIM*)}=0 or Δ (Delta), where a particular value of delta ($\Delta_{threshold}$) provides the predefined threshold For example, the value of delta may either be taken as 1 or 2 periods, where one period is equal to 6 minutes, because the HPPLMN search period is in terms of 6 minutes.

The duration of the first common HPPLMN timer may be:
a. The value of an HPPLMN Search period of SIM A,
b. The value of an HPPLMN Search period of SIM B, and
c. (The value of the HPPLMN Search period of SIM A+the value of the HPPLMN Search period of SIM B) divided by 2.

The separate timers for each SIM are initiated when the value of Δ (Delta) is above the predefined threshold ($\Delta_{threshold}$).

In an embodiment of the present disclosure, even when a value of Δ (Delta) is above the $\Delta_{threshold}$ but a relation between the HPPLMN timer for the search period of the first SIM200*a* (SIM A) and the HPPLMN timer for the search period of the second SIM200*b* (SIM B) satisfies certain conditions mentioned below at a particular iteration of the HPPLMN timer of each SIM, then only one first common HPPLMN timer can be initiated instead of two separate HPPLMN timers. The conditions are as below:

1. When the absolute difference between the HPPLMN Search period of SIM A and a Multiple of the HPPLMN Search period of SIM B is Negligible (Delta).

The HPPLMN Search period of SIM A−(N*the HPPLMN Search period of SIM B) is either 0 or Δ (where $\Delta <= \Delta_{threshold}$)

When the SC module 201 identifies the above situation, the second common HPPLMN timer for both the SIM A and the SIM B is started (initiated).

The same holds similarly for SIM B if an HPPLMN search period of SIM B−(N*the HPPLMN Search period of SIM A)=0 or Δ (where $\Delta <= \Delta_{threshold}$). When the SC module 201 identifies the above situation, the second common HPPLMN timer for both the SIM A and the SIM B is started (initiated).

Figure 11:
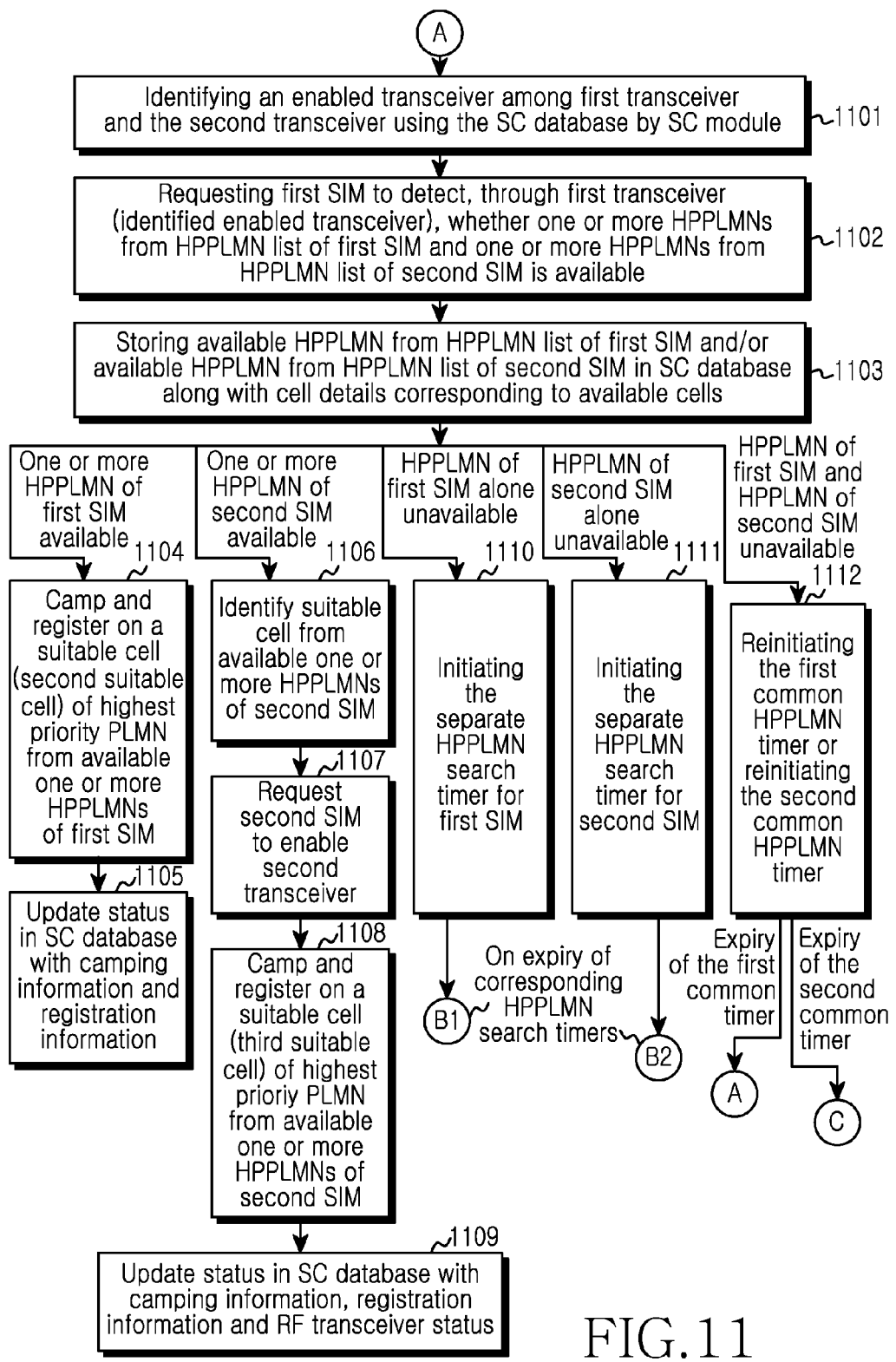
FIG. 11 is a flow diagram explaining a method for handling timer expiration actions of a first common HPPLMN timer or partial timer expiration actions of second common HPPLMN timer for the first SIM and the second SIM, according to embodiments of the present disclosure.

The value of delta can either be taken as 1 or 2 periods, since the HPPLMN search period is in terms of 6 minutes FIG. 11 is a flow diagram explaining the method for handling the timer expiration actions for the first common HPPLMN timer or the partial timer expiration actions of the second common HPPLMN timer for the first SIM and the second SIM, according to embodiments of the present disclosure. The steps of the method of FIG. 10 are performed upon expiration of the first common HPPLMN timer or when the timer expiration actions of the second common timer HPPLMN timer described later in FIG. 14 divert the method flow of FIG. 14 to FIG. 10.

At operation 1101, the method includes configuring the SC module 201 to identify an enabled transceiver among the first transceiver 200a and the second transceiver 200b. The enabled transceiver is identified using the status of both the SIMs maintained in the SC database 202. At operation 1102, the method includes configuring the SC module 201 to request the first SIM to detect, through the identified first transceiver 203a, whether one or more HPPLMNs from an HPPLMN list of the first SIM 200a and one or more HPPLMNs from an HPPLMN list of the second SIM200b is available. If the HPPLMNs are unavailable the method includes configuring the SC module 201 to wait for further updates from the wireless network 100. If one or more HPPLMNs from the HPPLMN list of the first SIM and/or one or more HPPLMNs from the HPPLMN list of the second SIM are available, at operation 1103, the method includes configuring the SC module 201 to store available HPPLMNs from the HPPLMN list of the first SIM 200a and/or available HPPLMNs from the HPPLMN list of the second SIM 200b in SC database 202 along with cell details corresponding to available cells.

Further, the method of FIG. 11 includes configuring the SC module 201 for performing further action based on the availability of the HPPLMNs as described below.

1. One or more HPPLMNs of the first SIM 200a are available:

Based on the availability status of the HPPLMNs maintained in the SC database 202, at operation 1104, the method includes allowing the first SIM 200a to camp and register on a suitable cell (second suitable cell) of a highest priority PLMN from one or more available HPPLMNs of the first SIM 200a.

The usage of the term "second suitable cell" is only for distinguishing the suitable cell of the highest priority PLMN selected at this point from one or more other suitable cells of the highest priority PLMN described at other points in the description. Also, the term "second" does not indicate any priority for the suitable cell being selected.

At operation 1105, the method includes allowing the first SIM 200a to update status in SC database 202 with camping information and registration information of the new cell.

2. One or more HPPLMNs of the second SIM are available:

At operation 1106, the method includes allowing the second SIM 200b to identify a suitable cell from one or more available HPPLMNs of the second SIM. At operation 1107, the method includes configuring the SC module 201 to request the second SIM 200b to enable the second transceiver 203b. At operation 1108, the method includes allowing the second SIM 200b to camp and register on a suitable cell (third suitable cell) of a highest priority PLMN from one or more available HPPLMNs of the second SIM 200b.

The usage of the term "third suitable cell" is only for distinguishing the suitable cell of the highest priority PLMN selected at this point from one or more other suitable cells of the highest priority PLMN described at other points in the description. Also, the term "third" does not indicate any priority for the suitable cell being selected.

At operation 1109, the method includes allowing the second SIM 200b to update status in SC database 202 with camping information and registration information of the new cell. The second SIM 200b also updates the RF transceiver status in the SC database 202 after the second transceiver is enabled for camping on the available HPPLMN.

3. An HPPLMN of only the first SIM is unavailable

At operation 1110, the method includes configuring the SC module 201 for initiating the separate HPPLMN timer for the first SIM 200a to search HPPLMN for the first SIM. Further, on expiration of the separate HPPLMN timer for the first SIM 200a, the method of FIG. 11 includes configuring the SC module 201 to perform steps as described later in FIG. 12.

4. An HPPLMN of only the second SIM is unavailable

At operation 1111, the method includes configuring the SC module 201 to initiate the separate HPPLMN timer for the second SIM 200b to search HPPLMN for the second SIM 200b. Further, on expiration of the separate HPPLMN timer for the second SIM 200b, the method of FIG. 11 includes configuring the SC module 201 to perform steps as described in FIG. 13.

5. An HPPLMN of the first SIM and an HPPLMN of the second SIM are unavailable

At operation 1112, the method includes configuring the SC module 201 to reinitiate either the first common HPPLMN timer or the second common HPPLMN timer based on the expiration of which HPPLMN timer triggered the steps of the method of FIG. 11. If the first common HPPLMN timer expires, the method flow diverts to the steps as described in FIG. 11. If the second common HPPLMN timer expires, the method flow diverts to the steps as described in FIG. 14. The various actions, acts, blocks, steps, and the like in the method of FIG. 11 may be performed in the order presented, in a different order, or simultaneously. Further, in some embodiments, some actions, acts, blocks, steps, and the like may be omitted, added, modified, skipped, and the like without departing from the scope of the invention.

Figure 12:
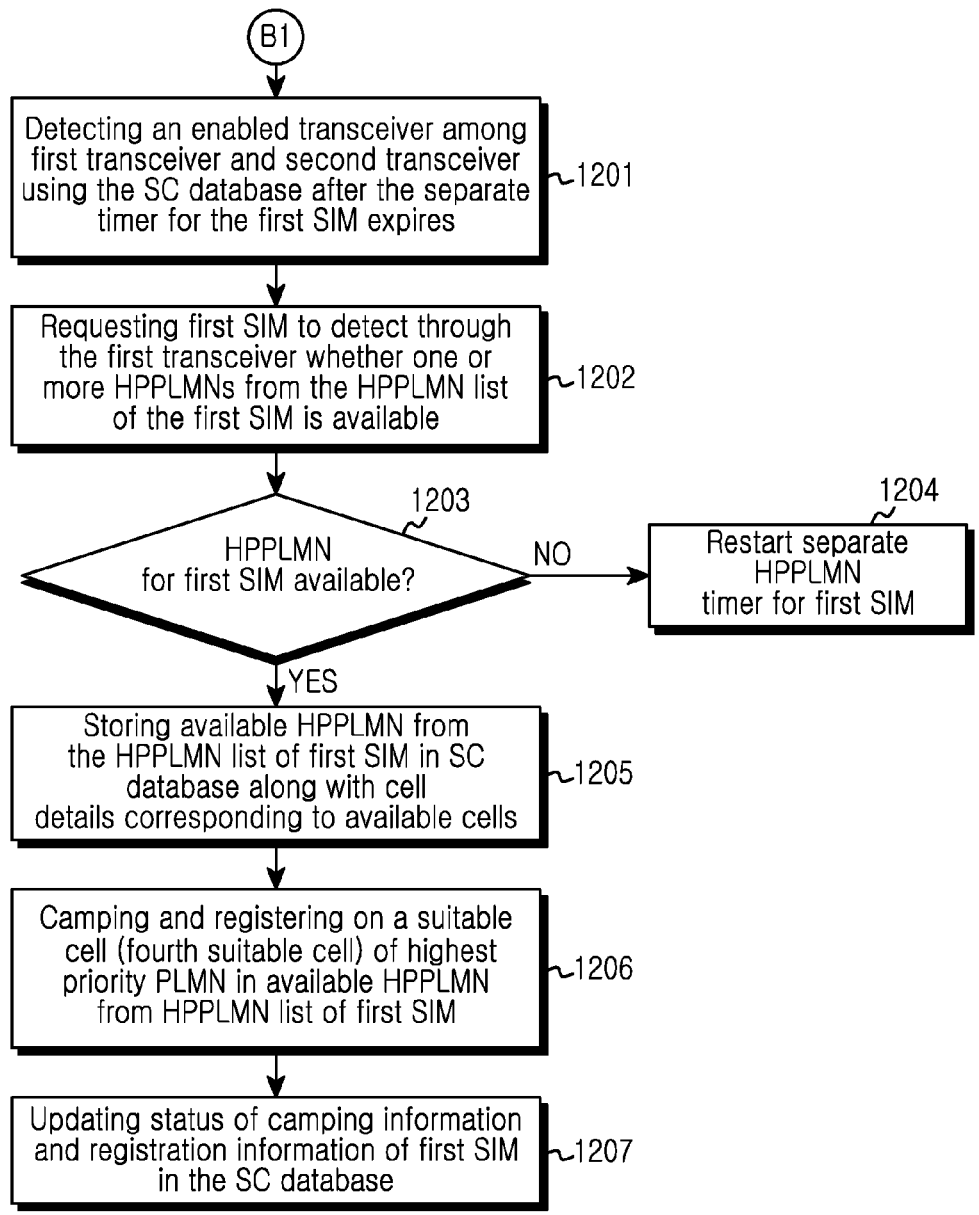
FIG. 12 is a flow diagram explaining a method for handling the timer expiration actions of a separate HPPLMN timer for the first SIM when the first transceiver is active, according to embodiments of the present disclosure.

FIG. 12 is a flow diagram explaining a method for handling timer expiration actions for the separate HPPLMN timer for the first SIM when the first transceiver is active, according to embodiments of the present disclosure. Upon identification of the expiration of the separate HPPLMN timer for the first SIM 200a at operation 1008 of FIG. 10, at operation 1110 of FIG. 11, or at operation 1405 of FIG. 14, the method includes configuring the SC module 201 to detect an enabled RF transceiver among the first transceiver 203a and the second transceiver 203b. The enabled transceiver is detected based on information maintained in the SC database 202. If the status of the first transceiver 203a in the SC database 202 is active, then at operation 1202, the method includes configuring the SC module 201 to request the first SIM 200a to detect, through the first transceiver 203a, whether one or more HPPLMNs from the HPPLMN list of the first SIM 200a is available. If, at operation 1203, it is determined that none of the HPPLMNs are available, then, at operation 1204, the method includes configuring the SC module 201 to restart the separate HPPLMN timer for the first SIM 200a. If, at operation 1203, it is determined that one or more HPPLMNs are available, then, at operation 1205, the method includes configuring the SC module 201 to store an available HPPLMN from the HPPLMN list of the first SIM 200a in SC database 202 along with cell details corresponding to available cells. At operation 1206, the method includes allowing the first SIM 200a to camp and register on a suitable cell (a fourth suitable cell) of a highest priority PLMN among available HPPLMNs from the HPPLMN list of the first SIM 200a.

The usage of the term "fourth suitable cell" is only for distinguishing the suitable cell of the highest priority PLMN selected at this point from one or more other suitable cells of the highest priority PLMN described at other points in the description. Also, the term "fourth" does not indicate any priority for the suitable cell being selected.

At operation 1207, the method includes allowing the first SIM 200a to update the status of camping information and registration information corresponding to the new cell of the first SIM 200a in the SC database 202. The various actions, acts, blocks, steps, and the like in the method of FIG. 12 may be performed in the order presented, in a different order, or simultaneously. Further, in some embodiments, some actions, acts, blocks, steps, and the like may be omitted, added, modified, skipped, and the like without departing from the scope of the invention.

Figure 13:
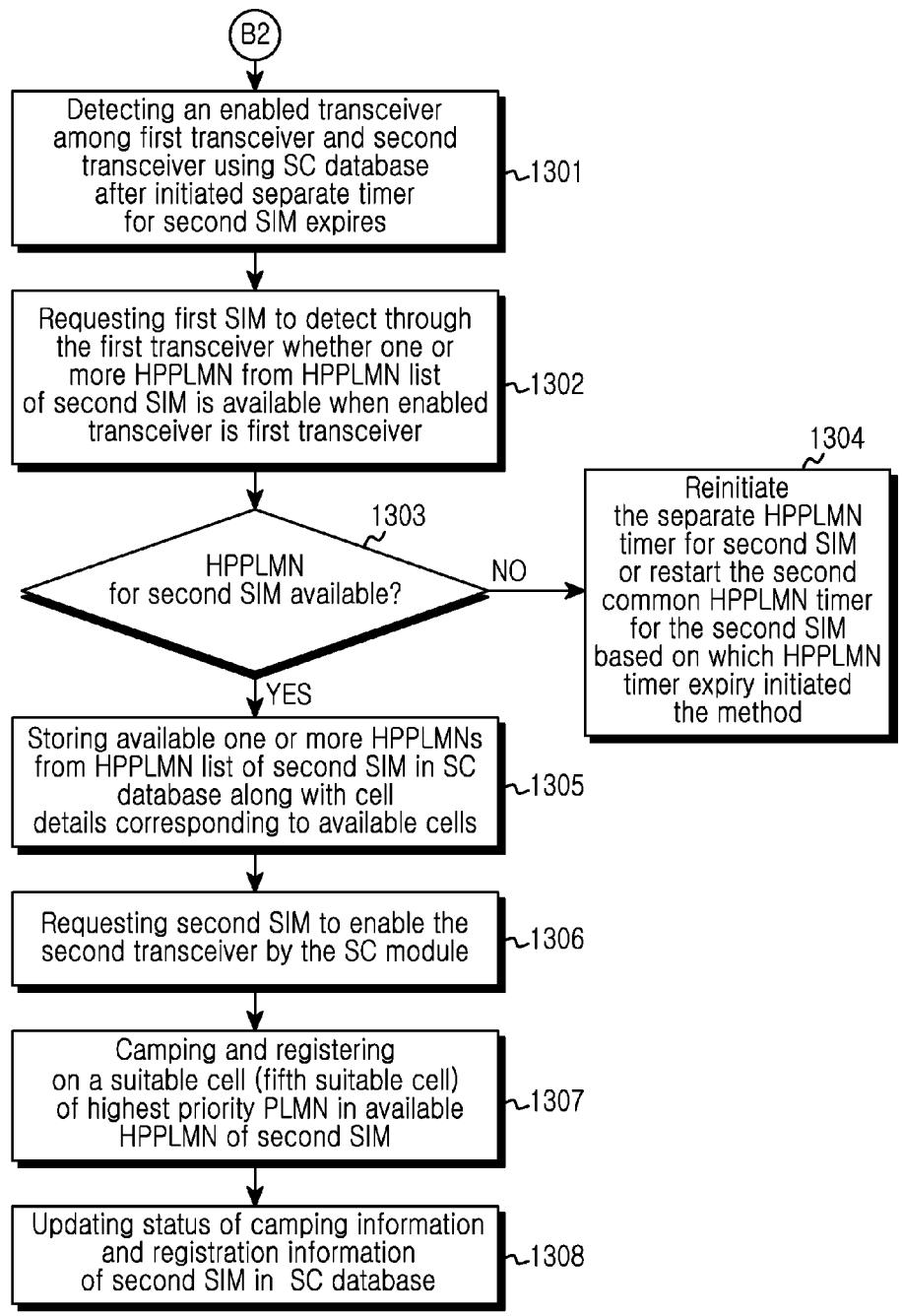
FIG. 13 is a flow diagram explaining a method for handling the timer expiration actions of a separate HPPLMN timer initiated for the second SIM when the first transceiver is active and the second transceiver is inactive, according to embodiments of the present disclosure.

FIG. 13 is a flow diagram explaining a method for handling the timer expiration actions for the separate HPPLMN timer for the second SIM when the first transceiver is active and the second transceiver is inactive, according to embodiments of the present disclosure. Upon the expiration of the initiated separate HPPLMN timer for the second SIM 200b at operation 1008 of FIG. 10, at operation 1111 of FIG. 11, or at operation 1402 of FIG. 14, at operation 1301, the method includes configuring the SC module 201 to detect an enabled transceiver among the first transceiver 203a and the second transceiver 203b based on information maintained in the SC database 202. If the first transceiver status in the SC database 202 is active, then, at operation 1302, the method includes configuring the SC module 201 to request the first SIM 200a to detect through the first transceiver 203a whether one or more HPPLMNs from the HPPLMN list of the second SIM are available. If, at operation 1303, it is determined that none of the HPPLMNs are available, then, at operation 1304, the method includes configuring the SC module 201 to reinitiate the separate HPPLMN timer for the second SIM 200b or restarting the second common HPPLMN timer for the second SIM 200b based on the expiration of which HPPLMN timer triggered the steps of the method of FIG. 13. Whenever the steps indicated in the method of FIG. 13 are triggered due to the expiration of the second common timer as in operation 1402 of FIG. 14 described later, then the second common timer is reinitiated for the next iteration. Whenever the steps indicated in the method of FIG. 13 are triggered due to the expiration of the separate HPPLMN timer for the second SIM 200b as in operation 1008 of FIG. 10 or operation 1111 of FIG. 11, then the separate HPPLMN timer for the second SIM 200b is reinitiated for the next iteration. If, at operation 1303, it is determined that one or more HPPLMNs are available, then at operation 1305, the method includes configuring the SC module 201 to store an available HPPLMN from the HPPLMN list of the second SIM 200b in SC database 202 along with cell details corresponding to available cells. At operation 1306, the method includes configuring the SC module 201 to request the second SIM 200b to enable the second transceiver 203b. At operation 1307, the method includes allowing the second SIM 200b to camp and register on a suitable cell (a fifth suitable cell) of a highest priority PLMN among available HPPLMNs from the HPPLMN list of the second SIM 200b.

The usage of the term "fifth suitable cell" is only for distinguishing the suitable cell of the highest priority PLMN selected at this point from one or more other suitable cells of the highest priority PLMN described at other points in the description. Also, the term "fifth" does not indicate any priority for the suitable cell being selected.

At operation 1308, the method includes allowing the second SIM 200b to update status of camping information and registration information of the second SIM in the SC database 202.

The various actions, acts, blocks, steps, and the like in the method of FIG. 13 may be performed in the order presented, in a different order, or simultaneously. Further, in some embodiments, some actions, acts, blocks, steps, and the like may be omitted, added, modified, skipped, and the like without departing from the scope of the invention.

Figure 14:
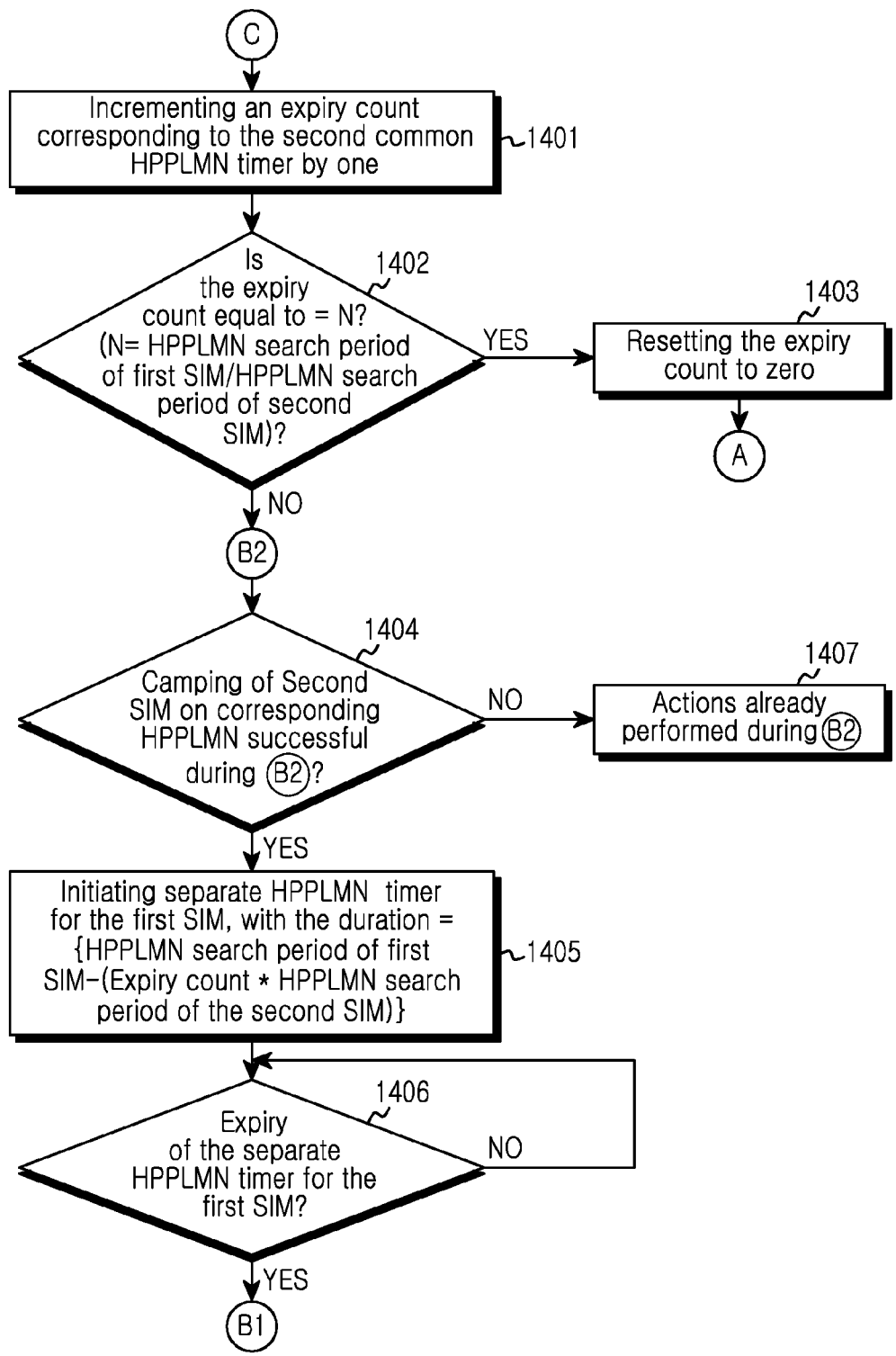
FIG. 14 is a flow diagram explaining a method for handling the timer expiration actions of the second common HPPLMN timer for the first SIM and the second SIM, according to embodiments of the present disclosure.

FIG. 14 is a flow diagram explaining a method for handling the timer expiration actions of the second common HPPLMN timer initiated for the first SIM and the second SIM, according to embodiments of the present disclosure.

The method describes a case when the HPPLMN search period of the second SIM is smaller than the HPPLMN search period of the first SIM, hence the HPPLMN timer expiration actions for second SIM are followed. However, the steps of the method of FIG. 14 can be applied for the reverse case when the HPPLMN search period of first SIM is smaller than the HPPLMN search period of the second SIM 200b. The method is modified accordingly still being in the scope of the method described.

Upon the expiration of the initiated second common HPPLMN timer corresponding to the second SIM 200b at operation 1010 of FIG. 10, at operation 1401, the method includes configuring the SC module 201 to increment an expiration count corresponding to the second common HPPLMN timer by one. At operation 1402, the method includes configuring the SC module 201 to determine whether the expiration count is equal to a value N. The value N indicates the value of a multiple by which the HPPLMN search period of the first SIM 200a is greater than that of the second SIM 200b. The value of N can be predefined, and may be computed using:

$$N = HPPLMN \text{ search period of the first } SIM \text{ divided by}$$
$$\text{the } HPPLMN \text{ search period of the second } SIM.$$

In response to determining, at operation 1402, that the expiration count is equal to N, the method includes configuring the SC module 201 to reset the expiration count to zero and perform steps as described in FIG. 11.

In response to determining, at operation 1402, that the expiration count is less than N, the method includes configuring the SC module 201 to perform timer expiration actions for the separate HPPLMN timer for the second SIM as described in FIG. 13 to search for the HPPLMN for the second SIM for camping on the available HPPLMN, after which the method returns to operation 1404.

At operation 1404, the method includes configuring the SC module 201 to determine whether camping of the second SIM 200b on the corresponding HPPLMN of the second SIM is successful. Upon successful camping of the second SIM 200b on the HPPLMN of the second SIM 200b, at operation 1405, the method includes configuring the SC module 201 to initiate the separate HPPLMN timer for the first SIM 200a. The duration of the separate HPPLMN timer for the first SIM 200a in this scenario is as described in the formula below:

$$\{HPPLMN \text{ search period of the first } SIM - (\text{Expiration count} * HPPLMN \text{ search period of the second } SIM)\}$$

At operation 1406, the method includes configuring the SC module 201 to check the expiration of the separate HPPLMN timer for the first SIM 200a. In response to determining, at operation 1406, that the separate HPPLMN timer for the first SIM 200a has expired, the method of FIG. 14 includes configuring the SC module 201 to perform the steps as described in FIG. 12.

However, if the camping of the second SIM 200b on the HPPLMN of the second SIM 200b is unsuccessful, the actions are already performed during the performing of the steps as described in FIG. 13. The various actions, acts, blocks, steps, and the like in the method of FIG. 14 may be performed in the order presented, in a different order, or simultaneously. Further, in some embodiments, some actions, acts, blocks, steps, and the like may be omitted, added, modified, skipped, and the like without departing from the scope of the invention.

Figure 15:
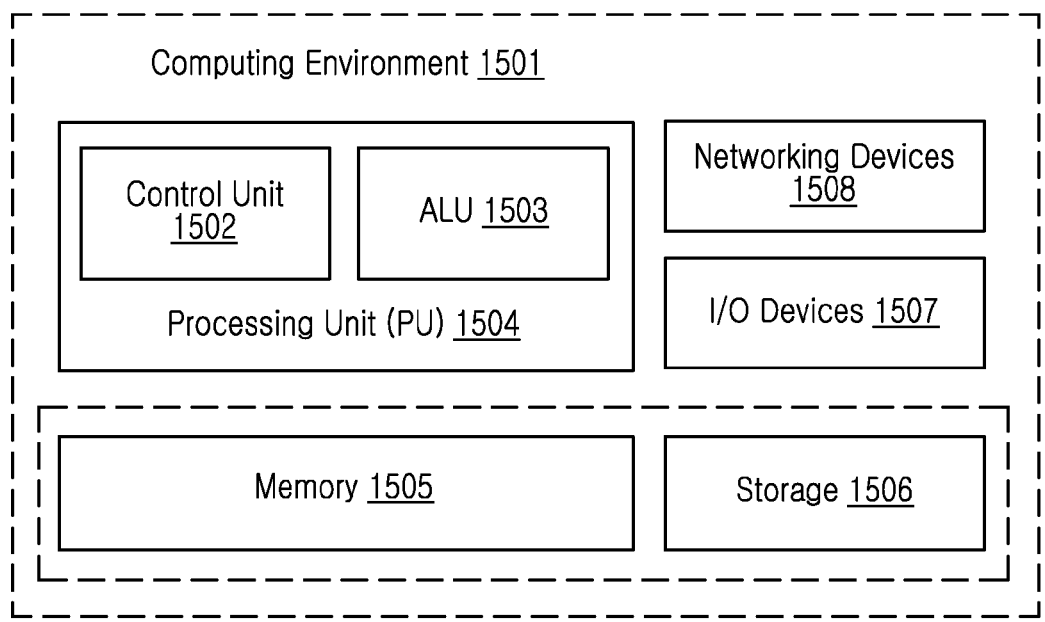
FIG. 15 illustrates a computing environment implementing a method for optimizing power consumption in multi-SIM active mobiles, according to embodiments of the present disclosure.

FIG. 15 illustrates a computing environment implementing a method and system for optimizing power consumption in multi-SIM active mobile devices, according to embodiments of the present disclosure. As depicted in FIG. 15, the computing environment 1501 comprises at least one processing unit 1504 that is equipped with a control unit 1502 and an Arithmetic Logic Unit (ALU) 1503, a memory 1505, a storage unit 1506, a plurality of networking devices 1508, and a plurality Input/Output (I/O) devices 1507. The processing unit 1504 is responsible for processing the instructions of the algorithm. The processing unit 1504 receives commands from the control unit 1502 in order to perform its processing. Further, any logical and arithmetic operations involved in the execution of the instructions are computed with the help of the ALU 1503.

The algorithm comprising instructions and codes required for the implementation are stored in either the memory unit 1505, the storage 1506, or both. At the time of execution, the instructions may be fetched from the corresponding memory 1505 and/or storage 1506, and executed by the processing unit 1504.

In case of any hardware implementations various networking devices 1508 or external I/O devices 1507 may be connected to the computing environment to support the implementation through the networking unit and the I/O device unit.

The embodiments disclosed herein can be implemented through at least one computer-readable storage medium encoded with a program of instructions for running on at least one device and performing network management functions to control the elements. The elements shown in FIGS. 1, 2, 6, 7, 8, and 15 include blocks which can be at least one of a hardware module, a software module, or a combination of the hardware module and the software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a multi-Subscriber Identity Module (SIM) mobile device, the method comprising:
   determining whether at least one Registered Public Land Mobile Network (RPLMN) among a first RPLMN of a first SIM and a second RPLMN of a second SIM of the multi-SIM mobile device is unavailable to the multi-SIM mobile device when the multi-SIM mobile device triggers a Public Land Mobile Network (PLMN) search;
   identifying a common PLMN, from a first PLMN set associated with the first SIM and a second PLMN set associated with the second SIM, in response to determining that the at least one RPLMN among the first RPLMN and the second RPLMN is unavailable; and
   camping on the common PLMN by the first SIM and the second SIM after acquiring camping information of the common PLMN.

2. The method of claim 1, wherein the first PLMN set includes the first RPLMN and an Equivalent PLMN (EPLMN) list of the first SIM and the second PLMN set includes the second RPLMN and an EPLMN list of the second SIM.

3. The method of claim 1, wherein availability of the first RPLMN and the second RPLMN is stored in a Stack Coordinator (SC) database of an SC module, after searching for the first RPLMN by the first SIM and the second RPLMN by the second SIM, when the multi-SIM mobile device triggers the PLMN search.

4. The method of claim 1, further comprising performing registration by the first SIM and the second SIM with the common PLMN, after the camping, through at least one of a first transceiver associated with the first SIM and a second transceiver associated with the second SIM.

5. The method of claim 4, further comprising:
   selecting one of the first transceiver associated with the first SIM and the second transceiver associated with the second SIM, by the SC module for receiving system information and paging information from the common PLMN after the registration of the first SIM and the second SIM with the common PLMN;
   disabling the second transceiver, by the SC module, when the first transceiver is selected; and
   storing a status of the selected first transceiver as active and of the disabled second transceiver as inactive by the SC module in an SC database.

6. The method of claim 5, further:
   receiving the system information and the paging information for the first SIM and the second SIM from the common PLMN by the first SIM through the selected first transceiver;
   determining an occurrence of an event by the first SIM, wherein the event comprises at least one of receiving updated system information and receiving paging information for the second SIM; and
   providing the updated system information and the paging information to the second SIM, by the SC module, in response to the determining of the occurrence of the event.

7. The method of claim 6, wherein the method further comprises:
   determining, by the SC module, whether a connected mode operation is required, wherein the connected mode operation is associated with one of the event and an activity by a user; and
   enabling the disabled second transceiver, by the SC module, to allow the first SIM and the second SIM to perform the connected mode operation.

8. The method of claim 4, wherein the registration of the first SIM and the second SIM with the common PLMN using the first transceiver and the second transceiver comprises:
   performing the registration of the first SIM through the first transceiver by the first SIM;
   performing the registration of the second SIM through the second transceiver by the second SIM; and
   storing registration information, received from the first SIM and the second SIM by the SC module, in the SC database after the registration of the first SIM and the second SIM.

9. The method of claim 4, wherein the registration of the first SIM and the second SIM with the common PLMN using one of the first transceiver and the second transceiver comprises:
   choosing one of the first transceiver and the second transceiver for the registration by the SC module;
   requesting the second SIM, by the SC module, to disable the second transceiver and send registration data for performing the registration, when the first transceiver is chosen for the registration;
   providing the registration data, received from the second SIM, to the first SIM through the SC module for performing the registration of the second SIM by the first SIM;
   performing the registration of the first SIM and the second SIM on the common PLMN through the first transceiver by the first SIM using one of a sequential registration procedure for the first SIM and the second SIM and a combined registration procedure for the first SIM and the second SIM; and storing registration information received for the first SIM, registration information received for the second SIM, status of the chosen first transceiver as active, and status of the disabled second transceiver as inactive, by the SC module in the SC database after the registration of the first SIM and the second SIM.

10. The method of claim 4, further comprising initiating a High Priority PLMN (HPPLMN) search timer for the second SIM when the second SIM is registered with the common PLMN, wherein the common PLMN is the first RPLMN, the first RPLMN is the HPPLMN for the first SIM, and the first RPLMN is a Visiting PLMN (VPLMN) for the second SIM; and performing timer expiration actions upon expiration of the initiated HPPLMN search timer for the second SIM.

11. The method of claim 10, wherein the HPPLMN search timer for the second SIM is initiated if an HPPLMN search period of the second SIM is non-zero.

12. The method of claim 10, wherein the timer expiration actions comprise sending an HPPLMN list of the second SIM to the first SIM.

13. The method of claim 12 wherein, if the first SIM identifies one or more HPPLMN from the HPPLMN list as available, the one or more HPPLMNs are stored in an SC data base with corresponding cell details of available one or more cells of the available one or more HPPLMNs.

14. The method of claim 13, wherein the second SIM is requested to enable the disabled second receiver and camp on a suitable cell of a highest priority PLMN of the second SIM.

15. The method of claim 4, wherein the method further comprises:

initiating one of a common High Priority PLMN (HPPLMN) search timer for the first SIM and the second SIM and a separate HPPLMN search timer for each of the first SIM and the second SIM, after selecting one of the common HPPLMN search timer and the separate HPPLMN search timer based on a difference between an HPPLMN search period for the first SIM and an HPPLMN search period for the second SIM, by the SC module when the first SIM and the second SIM are registered with the common PLMN, wherein the common PLMN comprises a common Equivalent PLMN (EPLMN) and the common EPLMN comprises a Visiting PLMN (VPLMN) for the first SIM and the second SIM;

performing timer expiration actions associated with the common HPPLMN timer upon expiration of the common HPPLM search timer; and performing timer expiration actions associated with the separate HPPLMN search timers.

16. The method of claim 1, wherein the common PLMN comprises one of the first RPLMN when the first RPLMN is available and the second RPLMN is unavailable, the second RPLMN when the second RPLMN is available and the first RPLMN is unavailable, and a common Equivalent PLMN (EPLMN) when the first RPLMN and the second RPLMN are both unavailable, wherein the common EPLMN is identified from an EPLMN list of the first SIM and an EPLMN list of the second SIM.

17. The method of claim 1, wherein, when the common PLMN is the first RPLMN, the camping on the common PLMN by the first SIM and the second SIM comprises:

allowing the first SIM to camp on the first RPLMN using the camping information acquired through the first transceiver during the PLMN search;

storing the camping information in the SC database;

providing the camping information to the second SIM; and allowing the second SIM to camp on the first RPLMN using the provided camping information.

18. The method of claim 1, wherein, when the common PLMN is a common Equivalent PLMN (EPLMN), the camping on the common PLMN by the first SIM and the second SIM comprises:

selecting one of the first transceiver and the second transceiver for camping on the common PLMN by acquiring the camping information;

allowing the first SIM to initiate a search for the common EPLMN through the first transceiver when the first transceiver is selected;

allowing the first SIM to camp on the common EPLMN if the common EPLMN is available;

storing the camping information acquired during the camping in the SC database;

providing the camping information to the second SIM; and allowing the second SIM to camp on the common EPLMN using the provided camping information.

19. A multi-Subscriber Identity Module (SIM) mobile device, the device comprising:

at least one processor;

a memory; and a Stack Coordinator (SC) module configured to:

determine whether at least one Registered Public Land Mobile Network (RPLMN), among a first RPLMN of a first SIM and a second RPLMN of a second SIM of the multi-SIM mobile device, is unavailable when the multi-SIM mobile device triggers a Public Land Mobile Network (PLMN) search;

identify a common PLMN, from a first PLMN set associated with the first SIM and a second PLMN set associated with the second SIM, in response to determining that at least one RPLMN among the first RPLMN and the second RPLMN is unavailable; and enable the first SIM and the second SIM to camp on the common PLMN by acquiring camping information of the common PLMN.

20. The device of claim 19, wherein the first PLMN set includes the first RPLMN and an Equivalent PLMN (EPLMN) list of the first SIM and the second PLMN set includes the second RPLMN and an EPLMN list of the second SIM.

21. The device of claim 19, wherein the SC module is further configured to store availability of the first RPLMN and the second RPLMN in a SC database of the SC module after searching for the first RPLMN by the first SIM and the second RPLMN by the second SIM when the multi-SIM mobile device triggers the PLMN search.

22. The device of claim 19, wherein the device is further configured to perform the registration, by the first SIM and the second SIM with the common PLMN, in response after the camping, through at least one of a first transceiver associated with the first SIM and a second transceiver associated with the second SIM, after selecting at least one of the first transceiver and the second transceiver by the SC module.

23. The device of claim 22, wherein the SC module is further configured to:

select one of the first transceiver associated with the first SIM and the second transceiver associated with the second SIM, for receiving system information and paging information from the common PLMN, after completion of the registration of the first SIM and the second SIM with the common PLMN;

disable the second transceiver when the first transceiver is selected; and store status of the selected the first transceiver as active and of the disabled second transceiver as inactive in an SC database.

24. The device of claim 23, wherein the device is further configured to:

receive the system information and the paging information, for the first SIM and the second SIM, from the common PLMN by the first SIM through the first transceiver;

determine an occurrence of an event by the first SIM, wherein the event comprises at least one of receiving updated system information and receiving paging information for the second SIM; and provide the updated system information and the paging information to the second SIM by the SC module in response to the determining of the occurrence of the event.

25. The device of claim 24, wherein the SC module is further configured to:

determine whether a connected mode operation is required, wherein the connected mode operation is associated with one of the event and an activity by a user; and enable the disabled second transceiver to allow the first SIM and the second SIM to perform the connected mode operation.

26. The device of claim 22, wherein the multi-SIM mobile device is configured to perform the registration of the first SIM and the second SIM with the common PLMN using the first transceiver and the second transceiver by:

performing the registration of the first SIM through the first transceiver by the first SIM;

performing the registration of the second SIM through the second transceiver by the second SIM; and storing registration information received from the first SIM and the second SIM by the SC module in an SC database after the registration of the first SIM and the second SIM.

27. The device of claim 22, wherein the device is further configured to perform the registration of the first SIM and the second SIM with the common PLMN using one of the first transceiver and the second transceiver by:

choosing one of the first transceiver and the second transceiver for the registration by the SC module;

requesting the second SIM, by the SC module, to disable the second transceiver and send registration data for performing the registration, when the first transceiver is chosen for the registration;

providing the registration data, received from the second SIM, to the first SIM through the SC module, for performing the registration of the second SIM by the first SIM;

performing the registration of the first SIM and the second SIM on the common PLMN through the first transceiver by the first SIM using one of a sequential registration procedure for the first SIM and the second SIM and a combined registration procedure for the first SIM and the second SIM; and storing registration information received for the first SIM, registration information received for the second SIM, a status of the chosen first transceiver as active and a status of the disabled second transceiver as inactive, by the SC module in an SC database after the registration of the first SIM and the second SIM.

28. The device of claim 22, wherein the SC module is further configured to:

initiate a High Priority PLMN (HPPLMN) search timer for the second SIM by the SC module when the second SIM is registered with the common PLMN, wherein the common PLMN comprises the first RPLMN, the first RPLMN comprises the HPPLMN for the first SIM, and the first RPLMN comprises a Visiting PLMN (VPLMN) for the second SIM; and perform timer expiration actions upon expiration of the initiated HPPLMN search timer for the second SIM.

29. The device of claim 28, wherein the HPPLMN search timer for the second SIM is initiated if an HPPLMN search period of the second SIM is non-zero.

30. The device of claim 28, wherein the timer expiration actions comprise sending an HPPLMN list of the second SIM to the first SIM.

31. The device of claim 30 wherein, if the first SIM identifies one or more HPPLMN from the HPPLMN list as available, the one or more HPPLMNs are stored in an SC data base with corresponding cell details of available one or more cells of the available one or more HPPLMNs.

32. The device of claim 31, wherein the second SIM is requested to enable the disabled second receiver and camp on a suitable cell of a highest priority PLMN of the second SIM.

33. The device of claim 22, wherein the SC module is further configured to:

initiate one of a common High Priority PLMN (HPPLMN) search timer for the first SIM and the second SIM and a separate HPPLMN search timer for each of the first SIM and the second SIM, after selecting one of the common HPLMN search timer and the separate HPPLMN search timer based on a difference between an HPPLMN search period for the first SIM and an HPPLMN search period for the second SIM when the first SIM and the second SIM are registered with the common PLMN, wherein the common PLMN comprises a common Equivalent PLMN (EPLMN) and the common EPLMN comprises a Visiting PLMN (VPLMN) for the first SIM and the second SIM;

perform timer expiration actions associated with the common HPPLMN timer upon expiration of the common HPPLM search timer; and perform timer expiration actions associated with the separate HPPLMN search timer.

34. The device of claim 19, wherein the common PLMN comprises one of the first RPLMN when the first RPLMN is available and the second RPLMN is unavailable, the second RPLMN when the second RPLMN is available and the first RPLMN is unavailable, and a common Equivalent PLMN (EPLMN) when the first RPLMN and the second RPLMN are unavailable, wherein the common EPLMN is identified from an EPLMN list of the first SIM and an EPLMN list of the second SIM.

35. The device of claim 19, wherein, when the common PLMN comprises the first RPLMN, the SC module is further configured to enable the first SIM and the second SIM to camp on the common PLMN by:

allowing the first SIM to camp on the first RPLMN using the camping information acquired through the first transceiver during the PLMN search;

storing the camping information in an SC database;

providing the camping information to the second SIM; and allowing the second SIM to camp on the first RPLMN using the provided camping information.

36. The device of claim 19, wherein, when the common PLMN comprises a common Equivalent PLMN (EPLMN), the SC module is further configured to enable the first SIM and the second SIM to camp on the common PLMN by:
- selecting one of a first transceiver associated with the first SIM and a second transceiver associated with the second SIM for camping on the common PLMN by acquiring the camping information;
- allowing the first SIM to initiate a search for the common EPLMN through the first transceiver when the first transceiver is selected;
- allowing the first SIM to camp on the common EPLMN if the common EPLMN is available;
- storing the camping information acquired during the camping in an SC database;
- providing the camping information to the second SIM; and
- allowing the second SIM to camp on the common EPLMN using the provided camping information.

* * * * *